(12) United States Patent
Tamura et al.

(10) Patent No.: US 8,458,425 B2
(45) Date of Patent: Jun. 4, 2013

(54) COMPUTER PROGRAM, APPARATUS, AND METHOD FOR MANAGING DATA

(75) Inventors: Masahisa Tamura, Kawasaki (JP);
Yasuo Noguchi, Kawasaki (JP);
Kazutaka Ogihara, Kawasaki (JP);
Tetsutaro Maruyama, Kawasaki (JP);
Yoshihiro Tsuchiya, Kawasaki (JP);
Takashi Watanabe, Kawasaki (JP);
Tatsuo Kumano, Kawasaki (JP);
Kazuichi Oe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 410 days.

(21) Appl. No.: 12/959,674

(22) Filed: Dec. 3, 2010

(65) Prior Publication Data
US 2011/0138144 A1 Jun. 9, 2011

(30) Foreign Application Priority Data
Dec. 4, 2009 (JP) .................................. 2009-276025

(51) Int. Cl.
*G06F 13/00* (2006.01)
(52) U.S. Cl.
USPC ........................................................ 711/166

(58) Field of Classification Search
None
See application file for complete search history.

(56) References Cited

U.S. PATENT DOCUMENTS

| 7,831,793 B2 | 11/2010 | Chakravarty et al. |
| 2005/0235109 A1 | 10/2005 | Ogihara et al. |

FOREIGN PATENT DOCUMENTS

| JP | 6-290092 A | 10/1994 |
| JP | 2006-277037 A | 10/2006 |
| JP | 2007-234026 A | 9/2007 |
| JP | 2008-158993 A | 7/2008 |
| WO | WO-2004/104845 | 12/2004 |

*Primary Examiner* — Duc Doan
(74) *Attorney, Agent, or Firm* — Fujitsu Patent Center

(57) ABSTRACT

A computer in a disk node executes a data management program. A deduplication-eligible data unit detection module detects a data unit whose deduplication grace period after last write time has expired. A deduplication address fetch module interacts with an index server to obtain a deduplication address associated with a unique value of data stored in a constituent storage space allocated to the data unit that is found to be deduplication-eligible. A constituent storage space deallocation module stores the obtained deduplication address in a data unit record memory, together with information indicating the detected data unit. Simultaneously a constituent storage space deallocation module releases the allocated constituent storage space from the detected data unit.

16 Claims, 30 Drawing Sheets

FIG. 6

50 LOGICAL-VOLUME SLICE METADATA

| \ | LOGICAL VOLUME ID | |
|---|---|---|
| \ | SEGMENT ID | |
| \ | LAST PATROL TIME | |
| Blank | - | |
| Normal | LAST WRITE TIME | DATA ENTITY OFFSET |
| Blank | - | |
| DeDup | DEDUPLICATE VOLUME ID | DEDUPLICATE OFFSET |
| Normal | LAST WRITE TIME | DATA ENTITY OFFSET |
| Blank | - | |
| ⋮ | ⋮ | |

DATA UNIT RECORD 50a $\dfrac{\text{SLICE SIZE}}{\text{UNIT SIZE}}$ [record]

FIG. 7

| 60 DEDUPLICATE-VOLUME SLICE METADATA | | |
|---|---|---|
| DEDUPLICATE VOLUME ID ||| 
| SEGMENT ID |||
| LAST PATROL TIME |||
| HASH VALUE Ha | RETENTION TIME LIMIT Ta | DATA ENTITY OFFSET Oa |
| HASH VALUE Hb | RETENTION TIME LIMIT Tb | DATA ENTITY OFFSET Ob |
| NULL |||
| HASH VALUE Hc | RETENTION TIME LIMIT Tc | DATA ENTITY OFFSET Oc |
| NULL |||
| HASH VALUE Hd | RETENTION TIME LIMIT Td | DATA ENTITY OFFSET Od |
| ⋮ | ⋮ | |

DEDUPLICATE UNIT RECORD 60a $\dfrac{\text{SLICE SIZE}}{\text{UNIT SIZE}}$ [record]

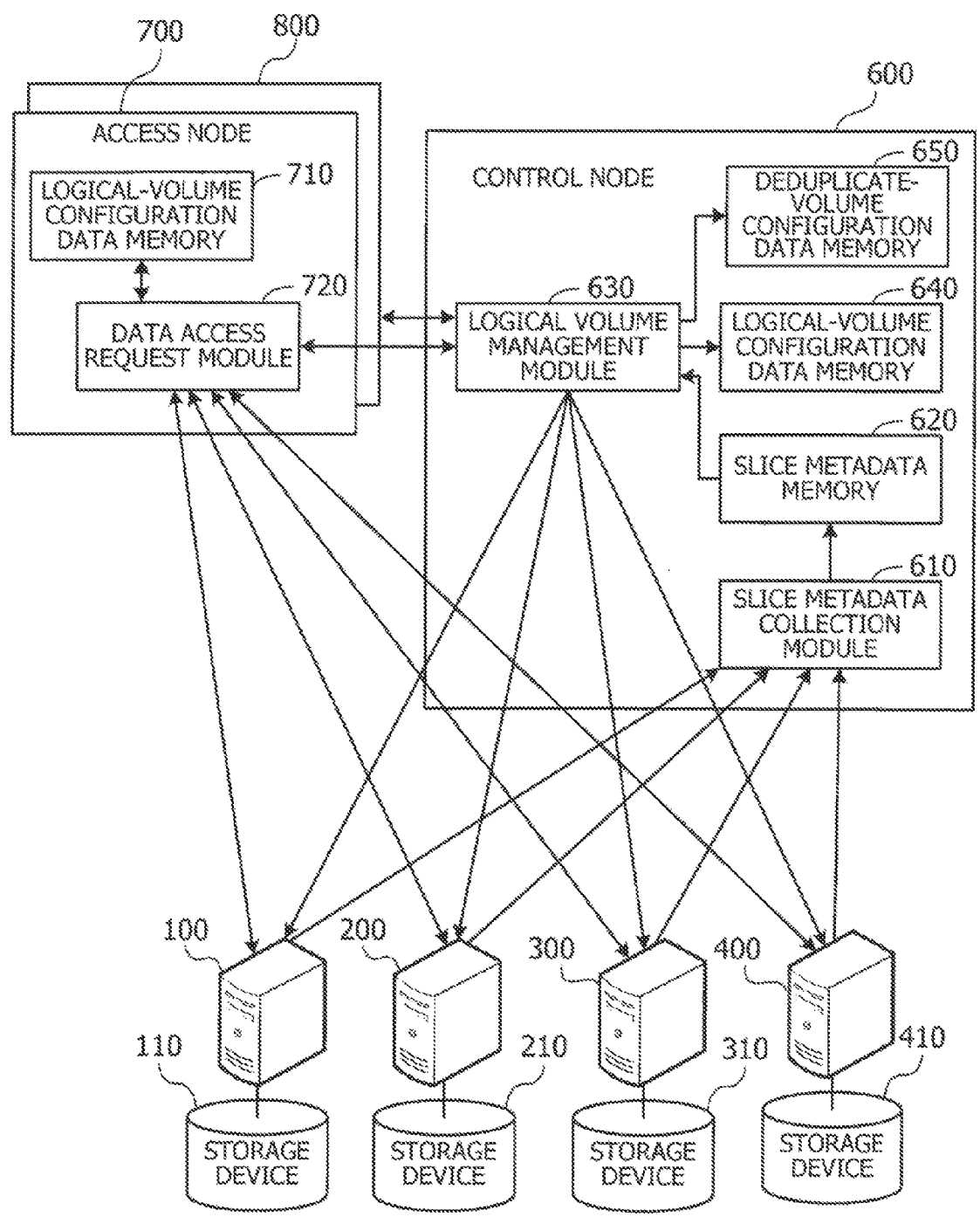

COMPUTER PROGRAM, APPARATUS, AND METHOD FOR MANAGING DATA

CROSS-REFERENCE TO RELATED APPLICATION

This application is based upon and claims the benefit of priority of the prior Japanese Patent Application No. 2009-276025, filed on Dec. 4, 2009, the entire contents of which are incorporated herein by reference.

FIELD

The embodiments discussed herein relate to a computer program, apparatus, and method for managing data.

BACKGROUND

Multi-node storage systems are known as a class of data storage systems which employ a plurality of computers to store and manage data in a distributed manner. Specifically, a multi-node storage system is formed from a plurality of disk nodes and a control node which are interconnected by a network. The system provides virtual disk volumes, or logical volumes, for access to storage data physically distributed in multiple disk nodes under the control of the control node.

More specifically, each logical volume in a multi-node storage system is divided into segments. Disk node, on the other hand, have their local storage devices, the space of which is divided into fixed-length slices. Here the slice length is equal to the segment length. The control node assigns one slice to each individual segment of logical volumes and informs client computers, or access nodes, of the resulting associations between the slices and segments. An access node may send write data for a specific segment to a disk node managing the slice corresponding to that segment. The disk node then stores the received data in its storage device.

The above-described multi-node storage system is scalable in terms of data capacity. That is, the manageable capacity of the system can easily be expanded by adding new disk nodes to the network.

A computer system may have two or more copies of the same data in its storage devices. Such duplication of data degrades the efficiency of storage space usage. For example, regular data backup operations tend to produce data duplications, and most of a new backup volume is often identical with the previous one. The following literature proposes several techniques to reduce the redundancy of stored data when it is moved in the course of a backup operation or the like.
International Publication Pamphlet No. WO/2004/104845
Japanese Laid-open Patent Publication No. 2007-234026

Looking at smaller units of data in computer storage, a plurality of identical pieces of data may coexist even in a system in operation. Suppose, for example, that an e-mail message with a file attachment is sent to a plurality of recipients sharing a mail server. In this case, the mail server stores that same received e-mail data in different storage locations corresponding to the recipients.

Particularly in a multi-node storage system configured to serve different users with different logical volumes, it is possible to install the same application program in each of those logical volumes. As a result of the installation, the multi-node storage system as a whole stores the same code in multiple locations.

Conventional multi-node storage systems are, however, unable to reduce the redundancy of stored data in the case where identical data blocks are distributed in different disk nodes. Accordingly, the same data occupies a space in each such disk node, thus wasting storage resources.

SUMMARY

According to an aspect of the invention, there is provided a computer-readable medium storing a data management program for use in a multi-node storage system formed from a plurality of disk nodes each managing a storage device to store data in a distributed manner. When executed by a computer serving as one of the disk nodes, the data management program causes the computer to perform the following process: allocating one of constituent storage spaces in a storage device coupled to the computer, to one of data units constituting a logical volume that provides a virtual storage space, in response to a write request specifying the one of data units as a destination of write data, and writing the write data to the allocated constituent storage space; recording, upon the writing of the write data, a current time in a data unit record memory as a record of last write time of the data unit to which the write data has been written; detecting, by consulting the data unit information memory, a data unit whose deduplication grace period after the last write time has expired; obtaining, from an index server, one of deduplication addresses that is associated with a first unique value obtained by applying a predetermined computation to data stored in the constituent storage space allocated to the detected data unit, wherein the index server manages the deduplication addresses each including an identifier of a disk node managing a deduplicate unit and a second unique value obtained by applying the predetermined computation to deduplication target data stored in the deduplicate unit, and wherein the deduplicate unit is provided in a plurality to constitute a deduplicate volume that provides another virtual storage space; and storing the obtained deduplication address in the data unit record memory, together with the detected data unit, while canceling the allocation of the constituent storage spaces to the detected data unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example data structure of logical-volume slice metadata;

FIG. 7 illustrates an example data structure of deduplicate-volume slice metadata;

FIG. 8 is a functional block diagram of a control node and access nodes;

DESCRIPTION OF EMBODIMENTS

Figure 1:
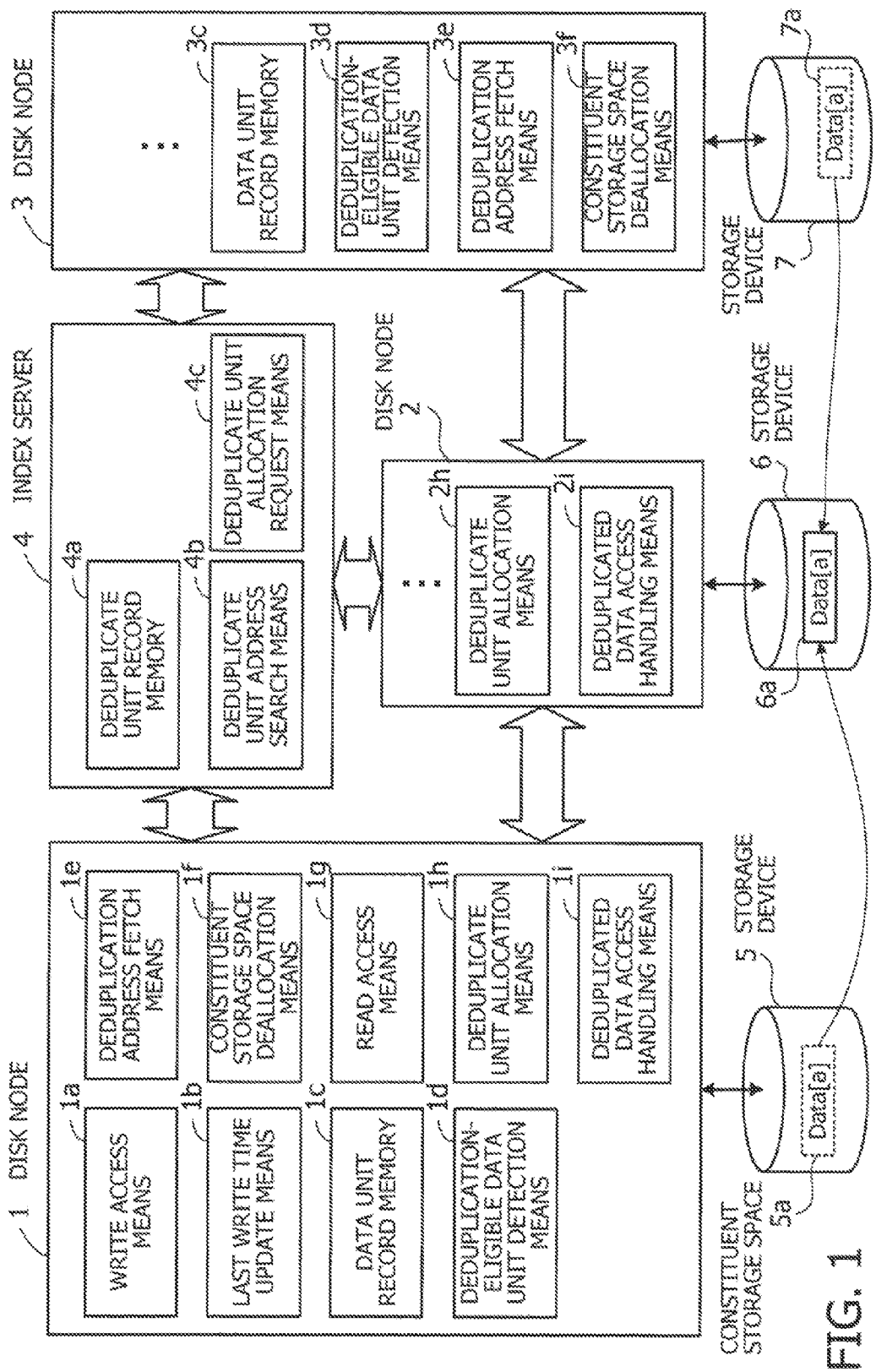
FIG. 1 is a block diagram illustrating a system configuration according to a first embodiment.

Embodiments of the present invention will be described below with reference to the accompanying drawings, wherein like reference numerals refer to like elements throughout.

First Embodiment

The first embodiment offers a multi-node storage system which stores substantive data (referred to as "data entities") in special virtual volumes (referred to as a "deduplicate volumes") while logical volumes of users contain indexes that point to the data entities. The processing operation to achieve such arrangement of data is referred to as "deduplication" (or DeDup, where appropriate). Deduplication reduces production of duplicated data in the system and thus enables more efficient use of storage space.

FIG. 1 is a block diagram illustrating a system configuration according to the first embodiment. The illustrated multi-node storage system of the first embodiment is designed to store data in a plurality of storage devices 5 to 7 respectively managed by a plurality of disk nodes 1 to 3. This multi-node storage system employs an index server 4 to manage the storage locations of data that is deduplicated through the deduplication processing mentioned above.

As seen in FIG. 1, one disk node 1 includes a write access module 1a, a last write time update module 1b, a data unit record memory 1c, a deduplication-eligible data unit detection module 1d, a deduplication address fetch module 1e, a constituent storage space deallocation module 1f, a read access module 1g, a deduplicate unit allocation module 1h, and a deduplicated data access handling module 1i.

A logical volume defining a virtual storage space is divided into a plurality of "data units." The write access module 1a is activated by a write request from computers (not illustrated in FIG. 1) for such data units of a logical volume. Upon receipt of a write request specifying a specific data unit, the write access module 1a selects one of constituent storage spaces in a storage device 5 connected to the disk node 1 and allocates it to the specified data unit. In the example of FIG. 1, the write access module 1a allocates a constituent storage space 5a and writes specified data in the allocated constituent storage space 5a.

In association with a write operation, the last write time update module 1b records the current time in a data unit record memory 1c as a record of the last write time the data unit underwent a write operation. The data unit record memory 1c offers a storage space for each individual data unit of a logical volume to record their last write times or deduplication addresses. For example, this data unit record memory 1c may be implemented as part of local memory space of the disk node 1. It may also be possible to implement this data unit record memory 1c as part of storage space of the storage device 5.

The term "deduplication address" mentioned above refers to a piece of information that includes the identifier of a deduplicate unit that stores deduplication target data being subjected to deduplication processing and the identifier of a disk node managing that deduplicate unit. The term "deduplicate unit" refers to a divided part of the virtual storage space defined as a deduplicate volume.

The deduplication-eligible data unit detection module 1d detects deduplication-eligible data units by consulting the data unit record memory 1c. The term "deduplication-eligible data unit" refers to a data unit whose deduplication grace period after the last write time has expired. The deduplication grace period is given as a predefined parameter for the deduplication-eligible data unit detection module 1d. When such a data unit is detected, the data stored in a constituent storage space 5a allocated to that data unit will be subjected to deduplication processing.

The deduplication address fetch module 1e obtains from the index server 4 a deduplication address that is associated with a unique value of data stored in the constituent storage space 5a allocated to the detected data unit. Here the term "unique value" refers to a value that is obtained by applying a predetermined computation on given data. This computation is supposed to produce different values for different source data. For example, the computation may be a hash function, which produces a hash value from given data for use as the unique value of that data. An appropriate hash function is selected so as to produce different hash values for different source data.

The constituent storage space deallocation module 1f stores the obtained deduplication address in the data unit record memory 1c as a record associated with the detected data unit. The constituent storage space deallocation module 1f also releases the constituent storage space 5a from the detected data unit, thus canceling the allocation. The released constituent storage space 5a returns to the unused state, meaning that the constituent storage space 5a is available for allocation for some other data unit or deduplicate unit. It is noted that the index server 4 may execute a deduplicate unit allocation process during the course of providing a deduplication address to the deduplication address fetch module 1e. When this is the case, the constituent storage space deallocation module 1f transfers data from the currently allocated constituent storage space 5a to a disk node specified by the deduplication address before releasing the constituent storage space 5a from the detected data unit.

The read access module 1g is activated by a read request for a specific data unit. In the case where the requested data unit has an allocated constituent storage space 5a, the read access module 1g reads data out of that constituent storage space 5a. In the case where the requested data unit has no allocated constituent storage space, the read access module 1g first consults the data unit information memory 1c to obtain a deduplication address associated with the data unit in question. The read access module 1g then retrieves deduplication target data from the disk node indicated in the obtained deduplication address, by specifying a particular deduplicate unit with its identifier included in the obtained deduplication address.

The deduplicate unit allocation module 1h is activated by a deduplicate unit allocation request for specific deduplication target data. Upon receipt of such a request from the index server 4, the deduplicate unit allocation module 1h allocates one of unused constituent storage spaces to a deduplicate unit and stores the deduplication target data in the allocated constituent storage space.

The deduplicated data access handling module 1i is activated by a data read request specifying an identifier of a specific deduplicate unit. Upon receipt of such a data read request, the deduplicated data access handling module 1i sends back deduplication target data read out of the constituent storage space allocated to the specified deduplicate unit.

Other disk nodes 2 and 3 are also formed from similar functional components described above for the disk node 1. For example, FIG. 1 illustrates two such components of the disk node 2, namely, a deduplicate unit allocation module 2h and a deduplicated data access handling module 2i. FIG. 1 also illustrates four such components of the disk node 3, namely, a data unit record memory 3c, a deduplication-eligible data unit detection module 3d, a deduplication address fetch module 3e, and a constituent storage space deallocation module 3f. Those components of the disk nodes 2 and 3 provide the same functions as their counterparts in the disk node 1.

The index server 4 includes a deduplicate unit record memory 4a, a deduplicate unit address search module 4b, and a deduplicate unit allocation request module 4c. These components of the index server 4 provide the functions described below.

The deduplicate unit record memory 4a stores deduplicate unit records, together with the identifiers of disk nodes managing deduplicate units corresponding to those deduplicate unit records. The deduplicate units constituting a deduplicate volume are managed in the disk nodes 1 to 3. Deduplicate unit records indicate whether each such deduplicate unit in the disk nodes 1 to 3 is actually used. For a deduplicate unit in use, its corresponding deduplicate unit record contains the identifier indicating the deduplicate unit and the unique value of deduplication target data stored in a constituent storage space allocated to the deduplicate unit.

The deduplicate unit address search module 4b receives from disk nodes 1 to 3 a deduplication address request concerning a specific deduplication-eligible data unit. This request contains a unique value that has been obtained by applying a predetermined computation to data in a constituent storage space allocated to the deduplication-eligible data unit. In response, the deduplicate unit address search module 4b searches the deduplicate unit record memory 4a to find a deduplicate unit record that contains the unique value specified in the deduplication address request. When a relevant deduplicate unit record is found, the deduplicate unit address search module 4b returns a deduplication address to the requesting disk node that has issued the deduplication address request. This deduplication address includes the identifier of a deduplicate unit which is extracted from the found deduplicate unit record. It also includes the identifier of a specific disk node, which indicates where the deduplicate unit corresponding to the found deduplicate unit record is managed.

When the above search ends up with no relevant records, the deduplicate unit address search module 4b requests the deduplicate unit allocation request module 4c to issue a request for allocation of a constituent storage space to the deduplicate unit of interest. The deduplicate unit address search module 4b then returns a deduplication address obtained as a result of allocation by the deduplicate unit allocation request module 4c, as its response to the deduplication address request from the disk node. This deduplication address includes the identifier of a deduplicate unit that the deduplicate unit allocation request module 4c has selected, as well as the identifier of the disk node managing that same deduplicate unit. The deduplicate unit address search module 4b also adds a piece of information to the above response to indicate that a deduplicate unit allocation process has been executed. This additional information permits the requesting disk node to transfer data in the storage space allocated to the data unit that has been detected as a deduplication-eligible data unit.

When the above search ends up with no relevant deduplicate unit records, the deduplicate unit allocation request module 4c consults the deduplicate unit record memory 4a to select an unused deduplicate unit. Then the deduplicate unit allocation request module 4c sends an allocation request to a disk node that manages the selected deduplicate unit, thus requesting the disk node to allocate its constituent storage space to the selected deduplicate unit. To reflect the result of constituent storage space allocation, the deduplicate unit allocation request module 4c stores an updated deduplicate unit record in the deduplicate unit record memory 4a. The deduplicate unit allocation request module 4c then passes a deduplication address to the deduplicate unit address search module 4b, which includes the identifier of the selected deduplicate unit and the identifier of the disk node managing the selected deduplicate unit.

The above multi-node storage system operates as follows, assuming that the disk node 1 has received a request for writing Data[a] in a data unit. In response to the write request, the write access module 1a first allocates a constituent storage space 5a to the specified data unit. The write access module 1a then writes the given write data, Data[a], to the allocated constituent storage space 5a. During this course, the last write time update module 1b stores a record of the current time in the data unit record memory 1c as the last write time of the data unit.

Afterwards the deduplication-eligible data unit detection module 1d detects a data unit whose deduplication grace period has expired after its last write time, and recognizes the detected data unit as a deduplication-eligible data unit. Suppose that, in the present example, Data[a] has not been changed for at least the deduplication grace period. The deduplication-eligible data unit detection module 1d thus examines the last write time of the data unit to which a constituent storage space 5*a* is assigned to store Data[a], and detects that the deduplication grace period of that data unit has expired.

Upon detection of a deduplication-eligible data unit, the deduplication address fetch module 1*e* interacts with the index server 4 to obtain a deduplication address that is associated with the unique value of data stored in the constituent storage space 5*a* allocated to the detected deduplication-eligible data unit. For example, the deduplication address fetch module 1*e* sends the index server 4 a deduplication address request containing a unique value obtained by executing a predetermined computation on Data[a] in the constituent storage space 5*a* allocated to the detected deduplication-eligible data unit.

In the index server 4, the deduplicate unit address search module 4*b* serves the above deduplication address request. That is, the deduplicate unit address search module 4*b* searches the deduplicate unit record memory 4*a* to find a deduplicate unit record that contains the same unique value specified in the deduplication address request. It is assumed here that, at this point in time, the deduplicate unit record memory 4*a* has no deduplicate unit record that matches with the unique value of Data[a]. Accordingly, the search ends up by finding no relevant deduplicate unit records.

The absence of relevant deduplicate unit records causes the deduplicate unit allocation request module 4*c* to select an unused deduplicate unit from among those managed in the deduplicate unit record memory 4*a*. It is assumed in the present example that a deduplicate unit in the disk node 2 is selected. The deduplicate unit allocation request module 4*c* now sends an allocation request to the disk node 2 managing the selected deduplicate unit, thus requesting the disk node 2 to allocate its constituent storage space to the selected deduplicate unit. In the disk node 2, the deduplicate unit allocation module 2*h* allocates a constituent storage space 6*a* to the selected unused deduplicate unit. The deduplicate unit allocation request module 4*c* stores a deduplicate unit record in the deduplicate unit record memory 4*a* so as to reflect the result of the constituent storage space allocation for the selected deduplicate unit. The deduplicate unit allocation request module 4*c* then passes a deduplication address to the deduplicate unit address search module 4*b*, which includes the identifier of the selected deduplicate unit and the identifier of the disk node 2 managing the selected deduplicate unit. The deduplicate unit address search module 4*b* then sends this deduplication address to the requesting disk node 1 that has issued the deduplication address request.

In the disk node 1, the deduplication address fetch module 1*e* receives the above deduplication address, which causes the constituent storage space deallocation module 1*f* to store the obtained deduplication address in the data unit record memory 1*c* as a record associated with the detected data unit. The constituent storage space deallocation module 1*f* also transfers Data[a] from the allocated constituent storage space 5*a* to the disk node 2 specified by the deduplication address. Then in the receiving disk node 2, the deduplicated data access handling module 2*i* stores Data[a] in the allocated constituent storage space 6*a*.

The constituent storage space deallocation module 1*f* now releases the constituent storage space 5*a* from the detected data unit, thus canceling the allocation. The released constituent storage space 5*a* returns to the unused state, which means that the constituent storage space 5*a* becomes available again for allocation for some other data unit or deduplicate unit.

It is noted that Data[a] has originally been managed by the disk node 1. As a result of the above-described deduplication processing, Data[a] is now managed as deduplication target data by another disk node 2. The disk node 1 is still able to read Data[a] by using the deduplication address. Suppose, for example, that a read request arrives at the disk node 1. When the requested data unit has an allocated constituent storage space 5*a* in the local storage device 5, the read access module 1*g* reads data out of that constituent storage space 5*a*. This constituent storage space 5*a*, however, may have been deallocated as described above, in which case the requested data does not reside in the storage device 5. The read access module 1*g* thus consults the data unit record memory 1*c* to obtain a deduplication address associated with the requested data unit and retrieves Data[a] from the disk node 2 specified in the obtained deduplication address. To execute this data retrieval from the remote disk node 2, the data unit record memory 1*c* specifies the identifier of a relevant deduplicate unit which is included in the obtained deduplication address. The identifier permits the disk node 2 to exactly determine which piece of data to read.

Afterwards the disk node 3 receives and stores new data in its local storage device 7. Suppose now that the data is identical with Data[a] formerly registered as deduplication target data and remains as it is for some time longer than the deduplication grace period. That is, another Data[a] is now stored in a constituent storage space 7*a* assigned to a data unit managed in the 3. The deduplication-eligible data unit detection module 3*d* in the disk node 3 examines the last write time of this data unit, thus detecting expiration of the deduplication grace period of that data unit.

Upon detection of such a deduplication-eligible data unit, the deduplication address fetch module 3*e* interacts with the index server 4 to obtain a deduplication address that is associated with a unique value of the data stored in the constituent storage space 7*a* allocated to the detected deduplication-eligible data unit. For example, the deduplication address fetch module 3*e* sends the index server 4 a deduplication address request containing a unique value of Data[a] stored in the constituent storage space 7*a* allocated to the detected deduplication-eligible data unit.

In response to the above deduplication address request, the deduplicate unit address search module 4*b* in the index server 4 searches the deduplicate unit record memory 4*a* to find a deduplicate unit record that contains the same unique value specified in the deduplication address request. Since the constituent storage space 6*a* stores the same Data[a] as in the constituent storage space 7*a*, the deduplicate unit address search module 4*b* finds a relevant deduplicate unit record describing the existing deduplicate unit to which the constituent storage space 6*a* is allocated. Accordingly, the deduplicate unit address search module 4*b* sends the found deduplication address back to the source node of the deduplication address request, i.e., disk node 3.

The disk node 3 receives the deduplication address at its deduplication address fetch module 3*e*. This causes the constituent storage space deallocation module 3*f* to store the received deduplication address in the data unit record memory 3*c* as a record associated with the detected data unit. The constituent storage space deallocation module 3*f* then releases the constituent storage space 7*a* from the detected data unit, thus canceling the allocation. It is noted here that the disk node 3, just as in the case with the disk node 1, can make read access to Data[a] in the storage device 6.

With the above-described mechanism of the proposed multi-node storage system, a plurality of data blocks duplicated in different disk nodes are consolidated into a single block. That is, the proposed multi-node storage system reduces the redundancy of stored data by removing data duplicated across the nodes, and thus enables more efficient use of data storage resources.

The above-described embodiment is designed to deduplicate data units only when they are left unchanged for more than a predetermined deduplication grace period. In other words, the deduplication processing skips data that is frequently changed. It is therefore possible to remove duplicated data without having much influence on the performance of the system.

Second Embodiment

A second embodiment will now be described below. The second embodiment offers a multi-node storage system in which the storage space of a logical volume is divided into fixed-length slices for management purpose. The deduplication techniques discussed in the foregoing first embodiment are applied to such a multi-node storage system.

In the second embodiment, a logical volume is managed on a segment basis, each segment being assigned a slice of a storage device. The system according to the second embodiment subdivides a slice into smaller units, allocates a constituent storage space to each such unit to store a data entity, and manages the presence of duplicated data on an individual unit basis.

According to the second embodiment, the system patrols logical volumes at regular intervals so as to deduplicate data units of a user's logical volume when its access frequency is decreased. The system, on the other hand, cancels the ongoing deduplication of a data unit when a write operation occurs to that unit. This data unit again receives allocation of a constituent storage space in the logical volume. It is noted that data units are not associated with any constituent storage spaces initially at the time of their allocation in a logical volume. Allocation of constituent storage spaces is not performed until the data units experience a write operation.

The index server collects records of deduplicate units in a deduplicate volume at the time of start up. When a disk node subjects its data unit to deduplication processing, the existing deduplicate units are searched to determine whether there is identical data. If no identical data is found, then the disk node is allowed to produce a new deduplicate unit to store the deduplication target data.

Each deduplicate unit has a retention time limit, the expiration of which causes the deduplicate unit to discard its stored data. The system executes a patrol operation at regular intervals, so that every data unit in the system will surely be tested in a specified period. A patrol operation on a data unit under deduplication includes referential access to a deduplicate unit to which the data unit is linked. When a deduplicate unit undergoes a read request from users or receives referential access in its patrol operation, the retention time limit of that deduplicate unit is extended by a predetermined retention period. By accepting patrol operations at intervals shorter than the retention period, the deduplicate unit is allowed to hold its data continuously as long as it is linked from at least one data unit. On the other hand, the deduplicate unit loses its allocation of a constituent storage space upon expiration of its retention time limit.

Figure 2:
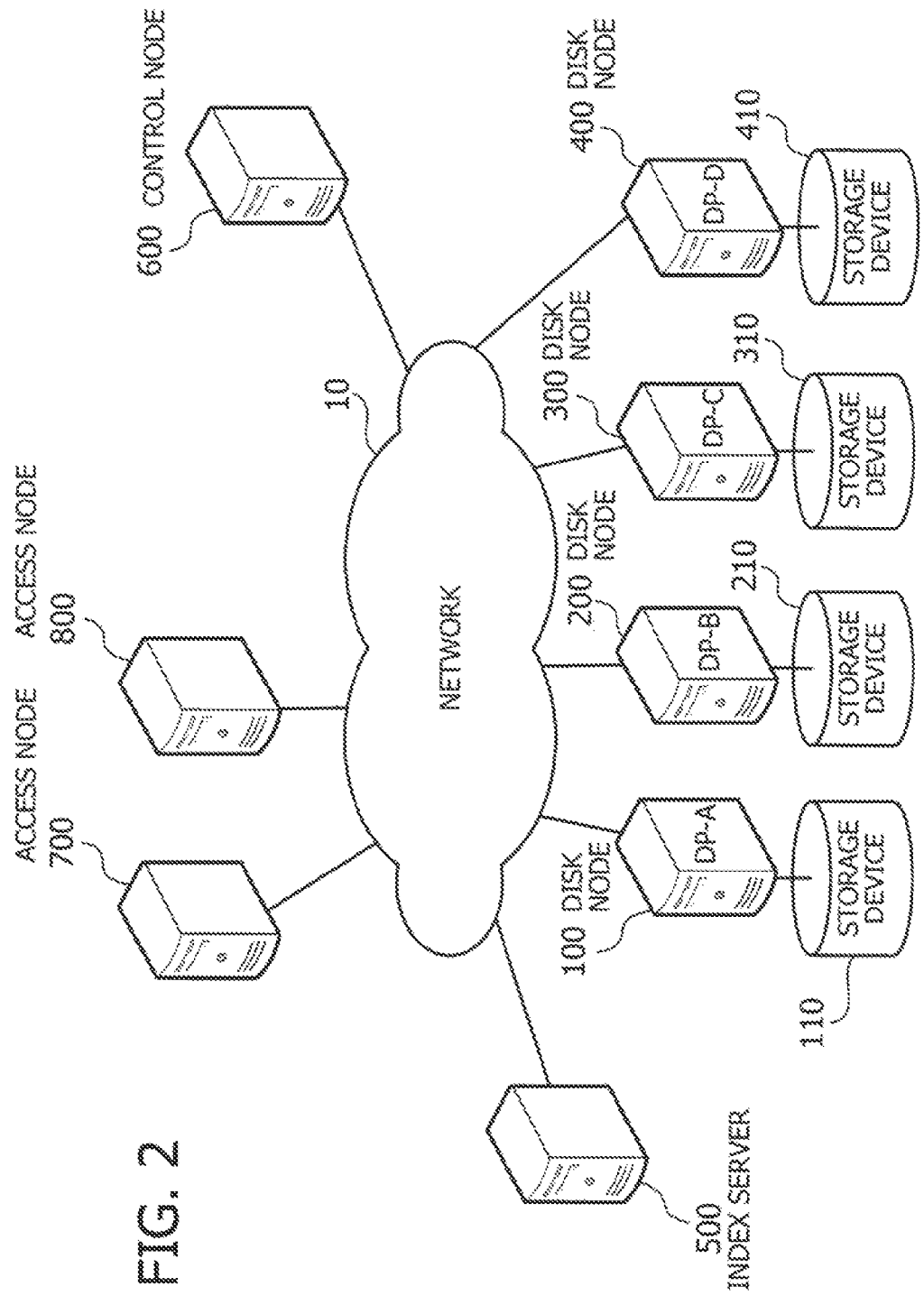
FIG. 2 illustrates an example system configuration according to a second embodiment.

FIG. 2 illustrates an example system configuration according to the second embodiment. A network 10 interconnects a plurality of disk nodes 100, 200, 300, and 400, an index server 500, a control node 600, and access nodes 700 and 800.

Disk nodes 100, 200, 300, and 400 are uniquely identified by their respective disk node IDs, "DP-A," "DP-B," "DP-C," and "DP-D." Those disk nodes 100, 200, 300, and 400 are coupled to storage devices 110, 210, 310, and 410, respectively. Each storage device 110, 210, 310, and 410 is configured as, for example, a redundant array of inexpensive disks—level 5 (RAID 5) to manage the stored data. The disk nodes 100, 200, 300, and 400 manage data in logical volumes according to commands from a control node 600. Also, the disk nodes 100, 200, 300, and 400 manage data in deduplicate volumes according to commands from the index server 500. Further, in response to requests from access nodes 700 and 800, the disk nodes 100, 200, 300, and 400 send and receive data managed as part of logical volumes to/from the storage devices 110, 210, 310, and 410. Further, in response to each other's request, the disk nodes 100, 200, 300, and 400 send and receive data managed as part of deduplicate volumes to/from the storage devices 110, 210, 310, and 410.

The index server 500 assigns given data to the storage devices 110, 210, 310, and 410 so as to store it in a deduplicate volume. Also the index server 500 sends an address of existing data in a deduplicate volume to a disk node when that disk node has new deduplication target data that matches with the existing data in the deduplicate volume. Further, the index server 500 regularly scans such data that is stored in the deduplicate volume but appears not used by any disk nodes.

The control node 600 creates a logical volume and a deduplicate volume and allocates storage spaces of the storage devices 110, 210, 310, and 410 to segments of the created logical volume and deduplicate volume. The allocation results of such logical volumes and deduplicate volumes are then distributed from the control node 600 to disk nodes 100, 200, 300, and 400. Similarly, the allocation results of logical volumes are also distributed to access nodes 700 and 800.

The access nodes 700 and 800 handle access requests from users to logical volumes. In response to an access request from a user, the access nodes 700 and 800 determine which disk node manages the requested data, based on the information that the control node 600 has provided to give the associations between logical volumes and their allocated storage spaces. The access nodes 700 and 800 then send a data access request to the relevant disk node and receive a response from that disk node. The access nodes 700 and 800 return this response to the requesting user.

The above-described system finds deduplication target data in a logical volume and moves the data to a deduplicate volume as necessary. According to the present embodiment, the data in a deduplicate volume is associated with its counterpart in a logical volume via their hash values. It is allowed to associate a single piece of data in a deduplicate volume with two or more pieces of data in logical volumes, without the need for duplicating the same data in multiple places.

Figure 3:
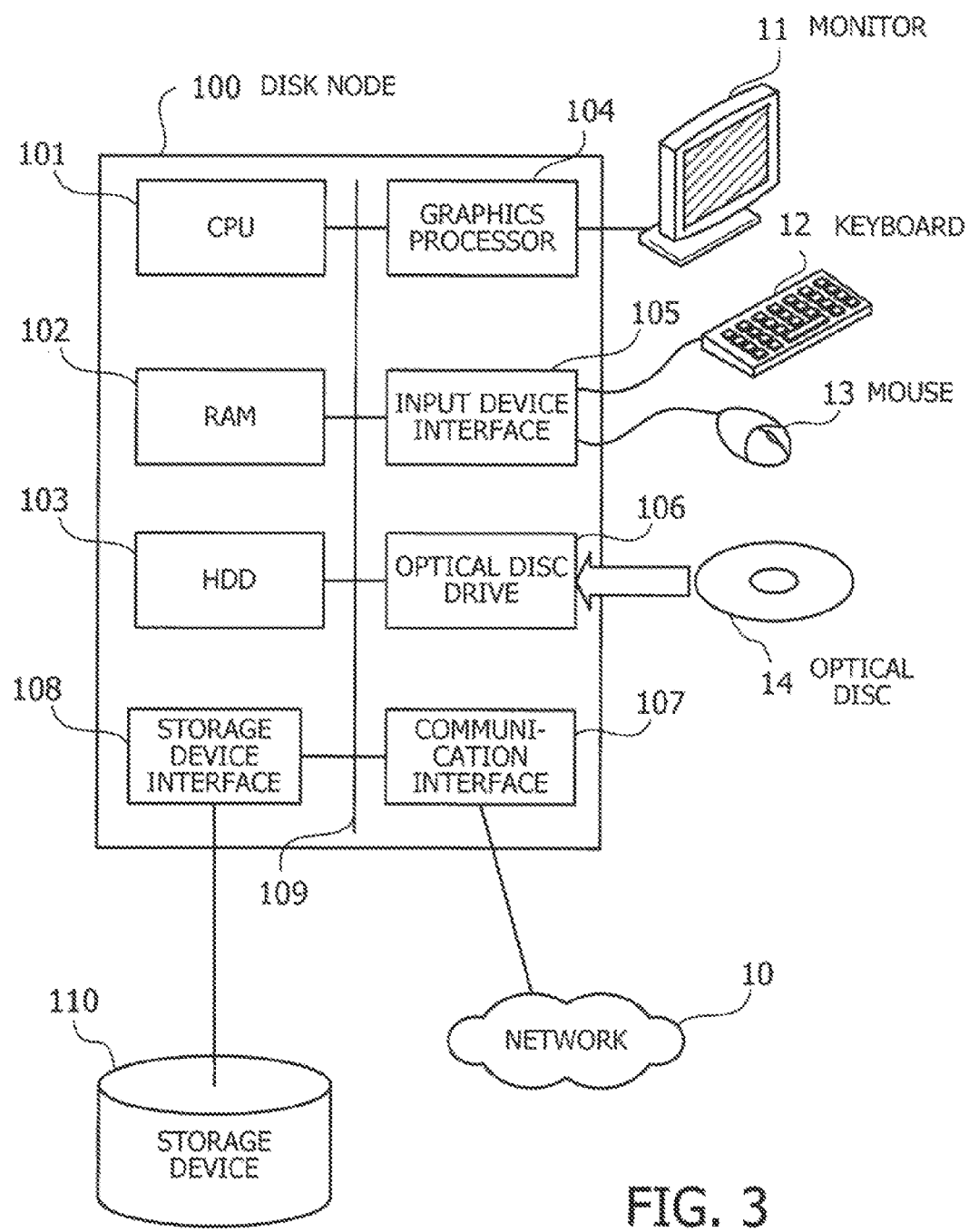
FIG. 3 illustrates an example hardware configuration of a disk node used in the present embodiment.

FIG. 3 illustrates an example hardware configuration of a disk node used in the present embodiment. The illustrated disk node 100 has a central processing unit (CPU) 101 to control the entire system of the disk node 100. The CPU 101 is connected to a random access memory (RAM) 102 and other various peripheral devices on a bus 109.

The RAM 102 serves as primary storage of the disk node 100. Specifically, the RAM 102 is used to temporarily store the whole or part of operating system (OS) programs and application programs that the CPU 101 executes, in addition to other various data objects manipulated at runtime.

The peripheral devices on the bus 109 are: a hard disk drive (HDD) 103, a graphics processor 104, an input device interface 105, an optical disc drive 106, a communication interface 107, and a storage device interface 108. The HDD 103 writes and reads data magnetically on its internal disk media. The HDD 103 serves as secondary storage of the disk node 100 to store program and data files of the operating system and applications. Flash memory and other semiconductor memory devices may also be used as secondary storage, in place of the HDD 103.

The graphics processor 104, coupled to a monitor 11, produces video images in accordance with drawing commands from the CPU 101 and displays them on a screen of the monitor 11. The monitor 11 may be, for example, a cathode ray tube (CRT) display or a liquid crystal display. The input device interface 105 receives signals from external input devices, such as a keyboard 12 and a mouse 13. Those input signals are supplied to the CPU 101. The mouse 13 is a pointing device, which may be replaced with other kinds of pointing devices such as touchscreen, tablet, touchpad, and trackball.

The optical disc drive 106 reads out data encoded on an optical disc 14, by using a laser light. The optical disc 14 is a portable data storage medium, the data recorded on which can be read as a reflection of light or the lack thereof. The optical disc 14 may be a digital versatile disc (DVD), DVD-RAM, compact disc read-only memory (CD-ROM), CD-Recordable (CD-R), or CD-Rewritable (CD-RW), for example.

The communication interface 107 is connected to a network 10 so as to exchange data with other computers (not illustrated). The storage device interface 108 is linked to a storage device 110. The storage device interface 108 performs data input and output operations on the storage device 110 according to commands from the CPU 101.

The above-described hardware platform may be used to realize the processing functions of the second embodiment. While FIG. 3 illustrates an example hardware configuration of the disk node 100 alone, the same configuration may also apply to other devices including the disk nodes 200, 300, and 400, index server 500, control node 600, and access nodes 700 and 800.

The following section will describe how the storage space of a storage device is allocated to logical volumes and deduplicate volumes.

Figure 4:
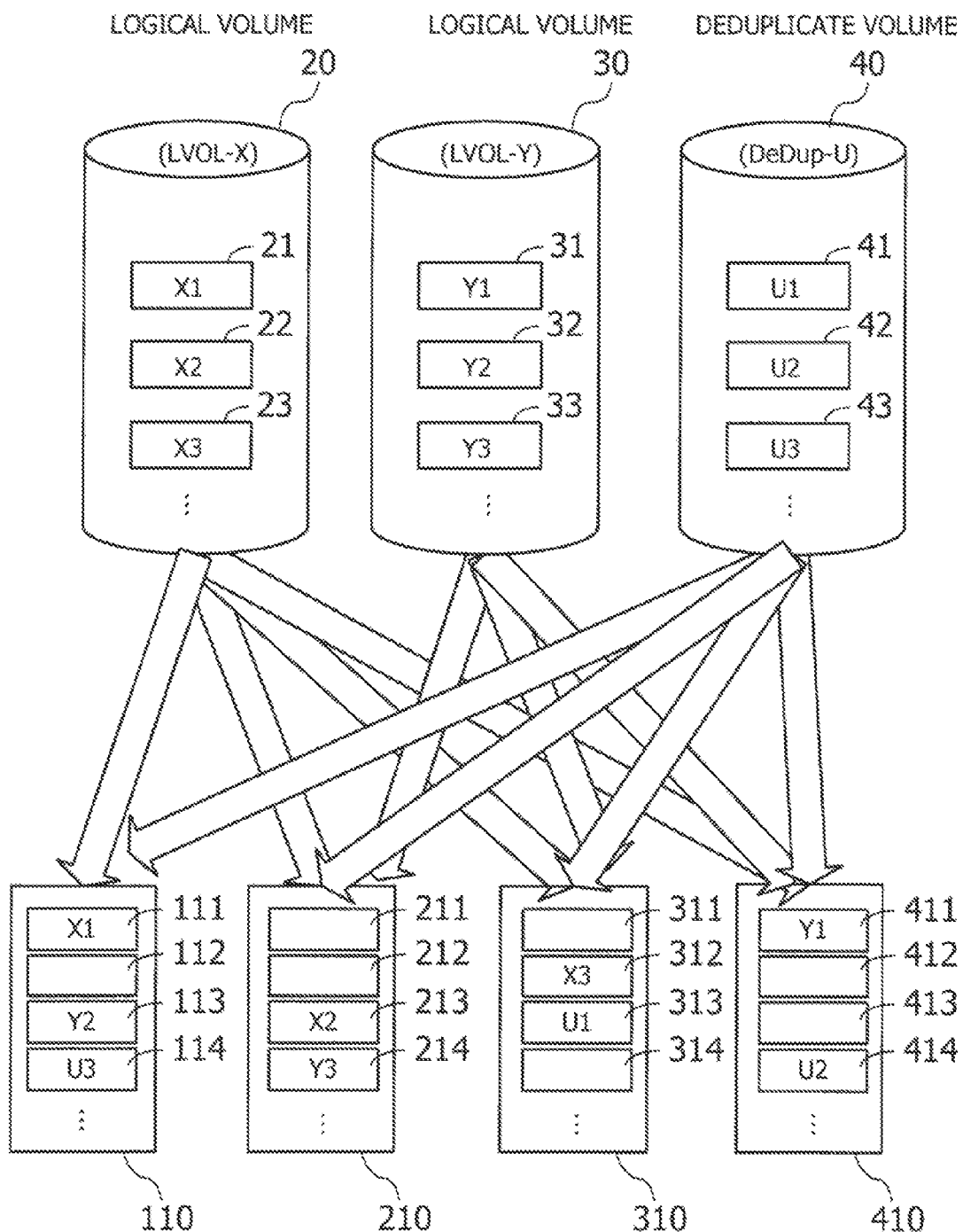
FIG. 4 illustrates how storage spaces are allocated to logical volumes and deduplicate volumes.

FIG. 4 illustrates allocation of storage space to logical volumes and deduplicate volumes. Provided in the example of FIG. 4 are two logical volumes 20 and 30 and one deduplicate volume 40. One logical volume 20 is identified by a logical volume ID of "LVOL-X." This logical volume 20 is formed from a plurality of segments 21, 22, 23, .... The other logical volume 30 is given a logical volume ID of "LVOL-Y." This logical volume 30 is similarly formed from a plurality of segments 31, 32, 33, .... The deduplicate volume 40, on the other hand, is identified by a deduplicate volume ID of "DeDup-U." This deduplicate volume 40 is formed from a plurality of segments 41, 42, 43, ....

Each segment of the logical volumes 20 and 30 and deduplicate volume 40 serves as a virtual storage space with a predetermined data capacity. For example, one segment stores 1 gigabytes (GB) of data. Each of those segments 21, 22, 23, ... is allocated a physical storage space available in the storage devices 110, 210, 310, and 410, as described below.

A plurality of slices 111, 112, 113, 114, ... are defined in one storage device 110, each slice having as large a storage space as one segment of logical volumes 20 and 30. Those slices 111, 112, 113, 114, ... may or may not be arranged successively in the storage device 110. In the case where, for example, the storage capacity is set to 1 GB per slice, the slice 111 is reserved as a storage space of 1 GB to accommodate data units with a predetermined data length.

Likewise, a plurality of slices 211, 212, 213, 214, ... are defined in another storage device 210. A plurality of slices 311, 312, 313, 314, ... are defined in yet another storage device 310. Further, a plurality of slices 411, 412, 413, 414, ... are defined in still another storage device 410.

The slices in each storage device 110, 210, 310, and 410 are subjected to allocation for the segments in the logical volumes 20 and 30 or deduplicate volume 40. For example, FIG. 4 illustrates three segments 21 to 23 in the logical volume 20, which are identified by segment IDs of X1, X2, and X3, respectively. Also illustrated are three segments 31 to 33 in the logical volume 30, which are identified by segment IDs of Y1, Y2, and Y3, respectively. Further illustrated are three segments 41 to 43 in the deduplicate volume 40, which are identified by segment IDs of U1, U2, and U3, respectively. In FIG. 4, each box representing a slice in those storage devices 110, 210, 310, and 410 contains a segment ID to indicate to which segment the slice is allocated.

Figure 5:
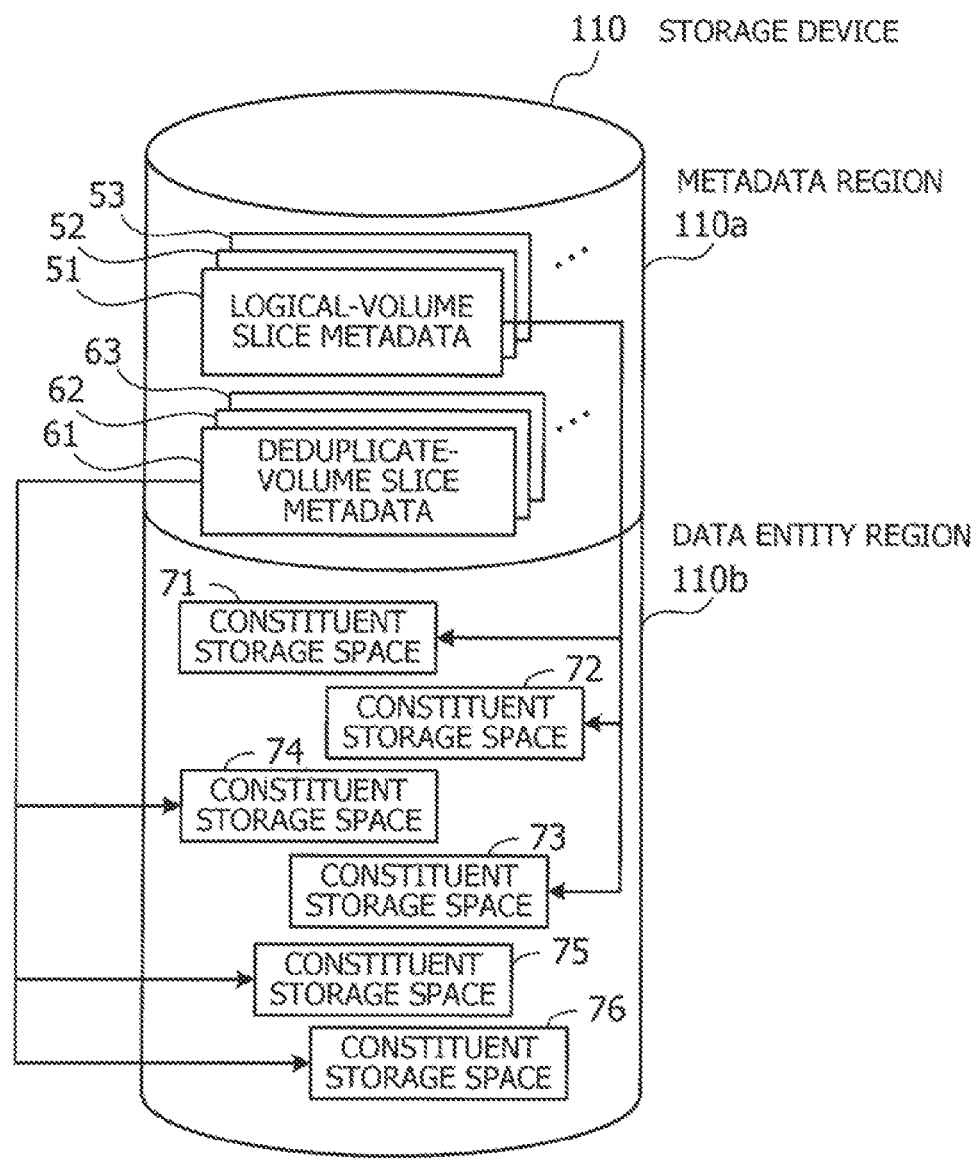
FIG. 5 illustrates an example of data stored in a storage device.

The storage devices 110, 210, 310, and 410 stores, among others, metadata of slices, i.e., the data that describes each slice. FIG. 5 illustrates an example of data stored in a storage device. Specifically, the illustrated storage space of the storage device 110 is largely divided into the following two regions: metadata region 110a and data entity region 110b. The metadata region 110a stores metadata used for the purpose of managing slices. Specifically, logical-volume slice metadata 51, 52, 53, ... is metadata of slices allocated to logical volumes. Deduplicate-volume slice metadata 61, 62, 63, ... is metadata of slices allocated to deduplicate volumes.

The data entity region 110b, on the other hand, is where the data entities, or substantive data, of a logical volume or deduplicate volume are stored. This data entity region 110b is further divided into a plurality of constituent storage spaces 71 to 76 each having the same data size as a data unit. Specifically, a slice allocated to a logical volume is assigned a plurality of constituent storage spaces 71 to 73, one for each data unit to be stored in the slice. Likewise, a slice allocated to a deduplicate volume is assigned a plurality of constituent storage spaces 74 to 76, one for each deduplicate unit to be stored in the slice.

Each piece of metadata in the metadata region 110a describes the locations of constituent storage spaces allocated to data units or deduplicate units of the slice corresponding to that metadata. Also, each piece of metadata contains an identifier of a logical volume or deduplicate volume and a specific segment ID, so as to indicate to which segment the corresponding slice is allocated, as well as to which volume the segment belongs. This information in the metadata associates each segment with constituent storage spaces actually storing substantive data. Accordingly, the metadata region 110a includes functions of the data unit record memory 1c, which has been discussed as part of a disk node 1 in the first embodiment.

The total number of metadata is equal to or greater than "minimum slice count," which is calculated by dividing the capacity of data entity region 110b by the slice size. Suppose, for example, that the data entity region 110b has a capacity of 300 GB while the slice size is 1 GB. In this case, the data entity region 110b can accommodate at least 300 slices, meaning that 300 pieces of metadata are created. The present embodiment, on the other hand, deduplicates data in the system on a data unit basis. It is therefore possible to define a lager number of slices than the minimum slice count noted above. Metadata is created by the control node 600 when a slice in the storage device 110 is allocated to a segment in a logical volume or deduplicate volume. The control node 600 sends metadata of the newly allocated slice to the corresponding disk node 100. The disk node 100 stores this metadata in the metadata region 110a of the storage device 110.

The following will describe the data structure of logical-volume slice metadata and deduplicate-volume slice metadata.

Discussed first is the data structure of logical-volume slice metadata. FIG. 6 illustrates an example data structure of logical-volume slice metadata 50. To define a particular slice of interest, this logical-volume slice metadata 50 has, among others, the following data fields: "Logical Volume ID," "Segment ID," and "Last Patrol Time." The logical volume ID field contains a logical volume ID of a specific logical volume accommodating a segment to which the slice of interest is allocated. The segment ID field contains a segment ID of the segment to which the slice of interest is allocated. The last patrol time field contains a time record indicating when the last patrol was performed on the slice of interest.

The logical-volume slice metadata 50 further includes a plurality of data unit records 50a, one for each data unit assigned to the slice of interest. Specifically, there are as many data unit records as the quotient obtained by dividing slice size by data unit size.

Each data unit record has a state field, which takes a value of "Blank," "Normal," or "DeDup." State "Blank" means that the data unit has not yet undergone a write operation; i.e., the data unit has no data entity. Every data unit in a slice is given an initial state of "Blank" when the slice is allocated to a segment.

State "Normal" means that the data unit has undergone a write operation; i.e., the data unit has a data entity in its allocated constituent storage space. The data unit record with a state of "Normal" has two more data fields named "Last Write Time" and "Data Entity Offset." The last write time field contains a time record indicating when the last write operation was made on the data unit. The data entity offset field indicates the location of a constituent storage space containing a data entity, as an offset relative to the top of the data entity region 110b.

State "DeDup" means that the data unit has undergone a write operation, and also that its data entity is now managed in the deduplicate volume 40 as being a target of deduplication processing. The data unit record with a state of "DeDup" has two more data fields named "Deduplicate Volume ID" and "Deduplicate Offset." The deduplicate volume ID field contains a deduplicate volume ID that indicates which deduplicate volume manages the data entity of the data unit. The deduplicate offset field indicates the location of a constituent storage space containing the data entity, as an offset relative to the top of the deduplicate volume.

The data structure of deduplicate-volume slice metadata will now be described below. FIG. 7 illustrates an example data structure of deduplicate-volume slice metadata. To define a particular slice of interest, this deduplicate-volume slice metadata 60 has, among others, the following data fields: "Deduplicate Volume ID," "Segment ID," and "Last Patrol Time." The deduplicate volume ID field contains a deduplicate volume ID of a specific deduplicate volume accommodating a segment to which the slice of interest is allocated. The segment ID field contains a segment ID of the segment to which the slice of interest is allocated. The last patrol time field contains a time record indicating when the last patrol was performed on the slice of interest.

The deduplicate-volume slice metadata 60 further includes a plurality of deduplicate unit records 60a, one for each deduplicate unit assigned to the slice of interest. Specifically, there are as many deduplicate unit records 60a as the quotient obtained by dividing slice size by deduplicate unit size. Deduplicate unit records 60a are arranged in the deduplicate-volume slice metadata in the order of locations of their corresponding deduplicate units in the segment space specified by the segment ID field. The closer the unit is to top of the segment, the higher the deduplicate unit record is positioned. That is, the deduplicate offset of the deduplicate unit corresponding to a specific deduplicate unit record 60a is calculated from an offset indicating the top of the segment and the position of the deduplicate unit record 60a in the deduplicate-volume slice metadata 60.

Each deduplicate unit record 60a is formed from the following data fields: "Hash Value," "Retention Time Limit," and "Data Entity Offset." The hash value field contains a hash value obtained by applying a predetermined hash function to a data entity written in the corresponding deduplicate unit. The retention time limit field specifies the time when the data under deduplication becomes obsolete. Upon expiration of the retention time limit of a deduplicate unit, the contents of that deduplicate unit is initialized.

The retention time limit field is given an initial value when data is written in the corresponding deduplicate unit for the first time. This initial value of retention time limit is obtained by adding a time longer than the patrol interval of slices to the data write time of the deduplicate unit. Then, each time an access request to the deduplicate unit is produced, its retention time limit is updated to extend the retention. The new retention time limit is calculated by adding a time longer than the patrol interval of slices to the time of the access. It is noted that a data access request is produced in two cases. One case is when an access node makes access to deduplication target data. The other case is when a patrol operation is executed on a slice that contains the same data as some existing deduplication target data.

The data entity offset field indicates the location of a constituent storage space containing a data entity of the deduplicate unit. The location is given as an offset relative to the top of the data entity region 110b.

The devices constituting the system start up with the above-described information (see FIGS. 5 to 7) stored in storage devices 110, 210, 310, and 410. Then, in each device, various functions begin their services to operate the distributed storage system as will be described below.

FIG. 8 is a functional block diagram of a control node and access nodes. The illustrated control node 600 includes a slice metadata collection module 610, a slice metadata memory 620, a logical volume management module 630, a logical-volume configuration data memory 640, and a deduplicate-volume configuration data memory 650.

The slice metadata collection module 610 collects metadata from each disk node 100, 200, 300, and 400 upon startup of the control node 600. More specifically, the slice metadata collection module 610 sends a request to each disk node 100, 200, 300, and 400, asking for logical-volume slice metadata and deduplicate-volume slice metadata. The disk nodes 100, 200, 300, and 400 then send their logical-volume slice metadata and deduplicate-volume slice metadata back to the control node 600, reading them out of the corresponding storage devices 110, 210, 310, and 410. The slice metadata collection module 610 stores the collected metadata in a slice metadata memory 620.

The slice metadata memory 620 is a storage space for metadata, including logical-volume slice metadata and deduplicate-volume slice metadata. More specifically, the slice metadata memory 620 stores logical-volume slice metadata and deduplicate-volume slice metadata with the data structure discussed in FIGS. 6 and 7, each with a disk node ID indicating the source disk node of metadata. For example, the slice metadata memory 620 may be implemented as part of RAM or HDD in the control node 600.

The logical volume management module 630 produces logical-volume configuration data, based on the logical-volume slice metadata stored in the slice metadata memory 620. More specifically, the logical volume management module 630 first sorts the logical-volume slice metadata into groups according to their logical volume IDs. Then the logical volume management module 630 extracts combinations of a segment ID and its corresponding disk node ID from a group of logical-volume slice metadata. Here the disk node ID indicates which disk node has sent the logical-volume slice metadata for a segment identified by the segment ID. The logical volume management module 630 sorts the extracted combinations of a segment ID and a disk node ID by segment ID, thereby producing configuration data of the logical volume represented by the group's logical volume ID. The logical volume management module 630 performs the above for each group and stores the resulting logical-volume configuration data in a logical-volume configuration data memory 640.

The logical volume management module 630 also produces deduplicate-volume configuration data based on deduplicate-volume slice metadata stored in the slice metadata memory 620. More specifically, the logical volume management module 630 first sorts the deduplicate-volume slice metadata into groups according to their deduplicate volume IDs. Then the logical volume management module 630 extracts combinations of a segment ID and its corresponding disk node ID from a group of deduplicate-volume slice metadata. Here the disk node ID indicates which disk node has sent the deduplicate-volume slice metadata for a segment identified by the segment ID. The logical volume management module 630 sorts the extracted combinations of a segment ID and a disk node ID by segment ID, thereby producing configuration data of the deduplicate volume represented by the group's deduplicate volume ID. The logical volume management module 630 performs the above for each group and stores the resulting deduplicate-volume configuration data in a deduplicate-volume configuration data memory 650.

The logical volume management module 630 may receive a metadata request from access nodes 700 and 800, the request specifying a specific segment of a logical volume. When this is the case, the logical volume management module 630 provides the requesting access node 700 and 800 with the metadata relevant to the specified segment. Similarly, the logical volume management module 630 may receive a metadata request from disk nodes 100, 200, 300, and 400, the request specifying a specific segment of a deduplicate volume. When this is the case, the logical volume management module 630 provides the requesting disk node 100, 200, 300, and 400 with metadata relevant to the specified segment.

The access node 700 includes a logical-volume configuration data memory 710 and a data access request module 720. While FIG. 8 specifically illustrates functions of one access node 700, the other access node 800 also has similar functions. The logical-volume configuration data memory 710 stores information that describes which disk node manages each particular segment of logical volumes. More specifically, the logical-volume configuration data memory 710 stores, for each particular segment in a logical volume, an offset range indicating which portion of the logical volume the segment takes up, together with a relevant disk node ID, and in combination with the logical volume ID. For example, the logical-volume configuration data memory 710 may be implemented as part of RAM or HDD in the access node 700.

The data access request module 720 is activated by a data access request from users. In response to such a request for specific data, the data access request module 720 consults the logical-volume configuration data memory 710 to determine which disk node manages the specified data. The data access request module 720 then sends an access request to the determined disk node.

The logical-volume configuration data memory 710 may not always contain information on the segment to which the specified data belongs. If there is no relevant information, then the data access request module 720 requests the control node 600 to provide metadata of the segment in question. The control node 600 provides the requested metadata, which permits the data access request module 720 to determine which disk node manages the specified data. The data access request module 720 then sends an access request to the determined disk node, as well as storing a new entry in the logical-volume configuration data memory 710 to register the segment, based on the obtained metadata.

The disk node executes the access request and sends the result back to the data access request module 720. Upon receipt of the result of data access, the data access request module 720 forwards it to the requesting user as a response to the data access request.

The following section will provide more details of what information is stored in the control node 600 and access nodes 700 and 800.

Figure 9:
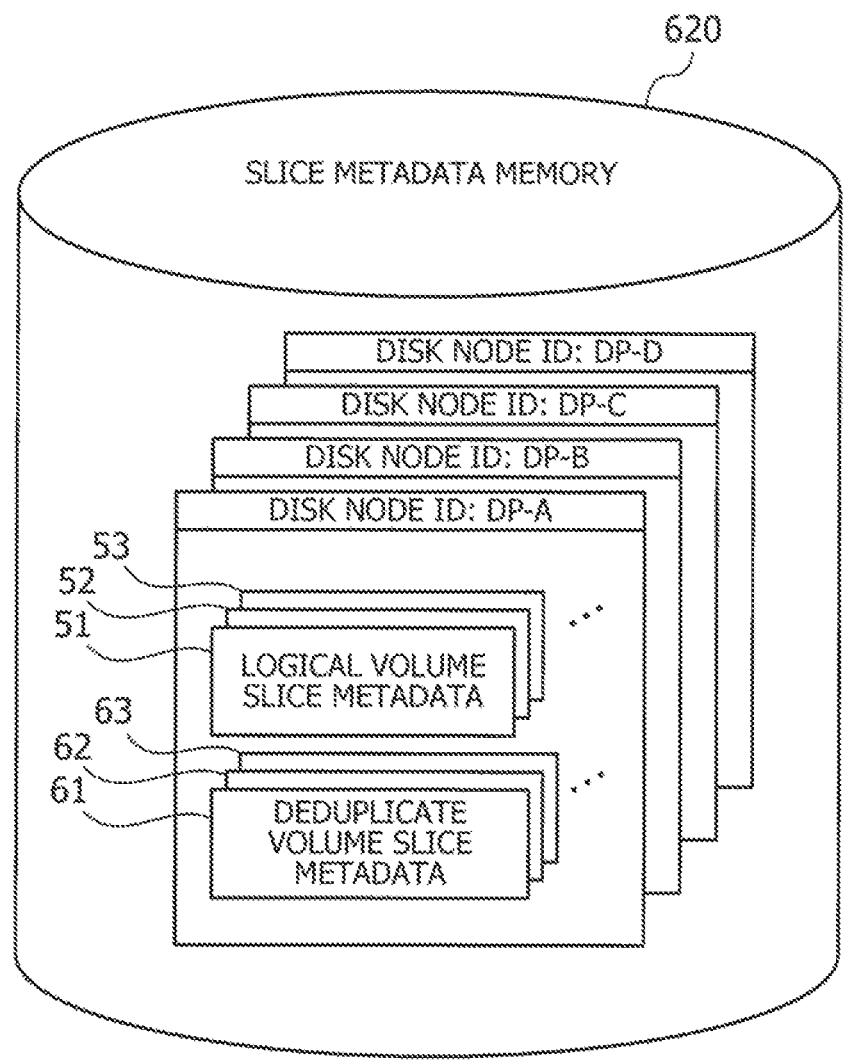
FIG. 9 illustrates an example data structure of a slice metadata memory in the control node.

FIG. 9 illustrates an example data structure of the slice metadata memory 620 in the control node 600. The slice metadata memory 620 stores a plurality of sets of logical-volume slice metadata and deduplicate-volume slice metadata, each set being associated with a disk node ID indicating the source disk node. For example, one disk node 100 transmits logical-volume slice metadata 51, 52, 53, ... and deduplicate-volume slice metadata 61, 62, 63, ... stored in the metadata region 110a of the storage device 110 (FIG. 5). These pieces of metadata are collected in the slice metadata memory 620, together with a disk node ID "DP-A" representing their source disk node 100.

Figure 10:
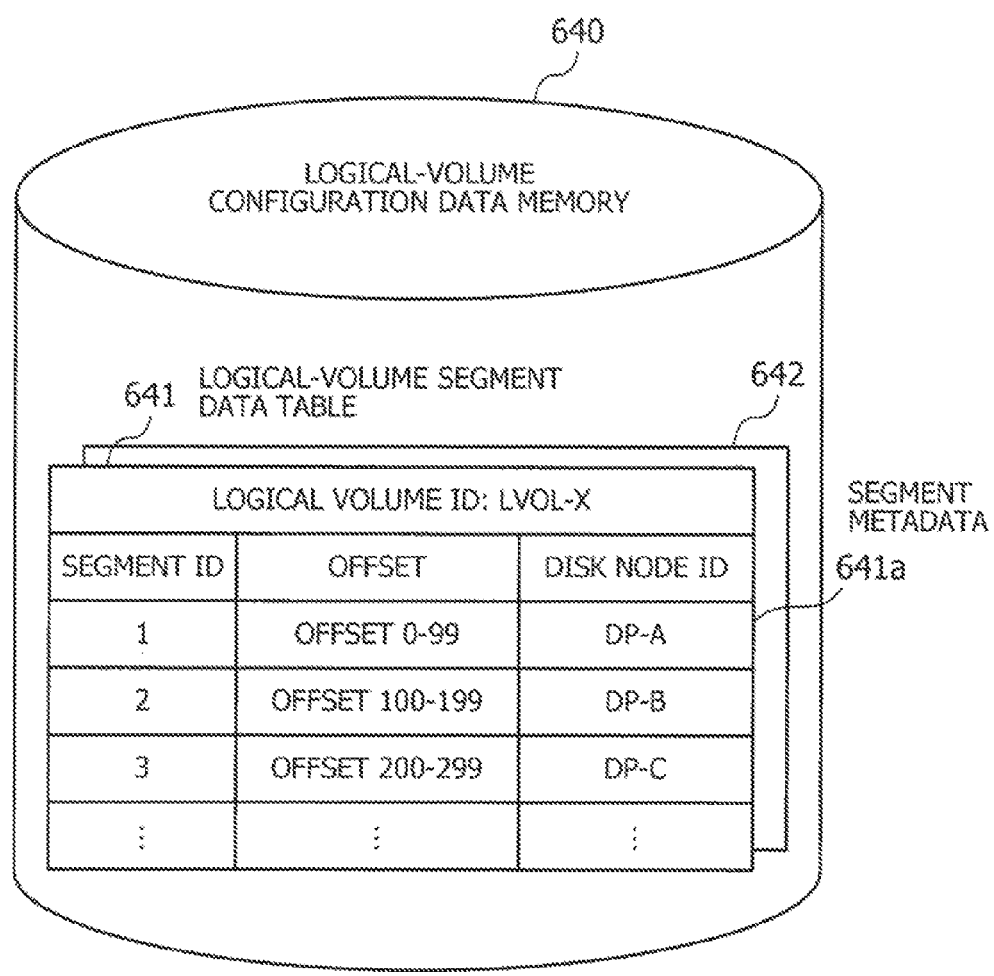
FIG. 10 illustrates an example data structure of a logical-volume configuration data memory in the control node.

Based on the above information stored in the slice metadata memory 620, the logical volume management module 630 produces logical-volume configuration data and deduplicate-volume configuration data. FIG. 10 illustrates an example data structure of the logical-volume configuration data memory 640 in the control node 600. The illustrated logical-volume configuration data memory 640 contains a plurality of logical-volume segment data tables 641 and 642, one for each logical volume. As seen, the logical-volume segment data table 641 is labeled with a specific logical volume ID, "LVOL-X." The logical-volume segment data table 641 has the following data fields: "Segment ID," "Offset," and "Disk Node ID." The field values arranged in the horizontal direction are associated with each other and thus form a single piece of metadata describing each specific segment, which is referred to as a segment metadata 641a.

The segment ID field contains an identifier indicating a specific segment. The offset field indicates storage space that belongs to the segment as a range of offsets relative to top of the storage space of its logical volume. More specifically, the offset field contains a start-point offset and an end-point offset, indicating where the segment begins and ends, respectively. The disk node ID field contains a disk node ID indicating a specific disk node that manages the segment.

Figure 11:
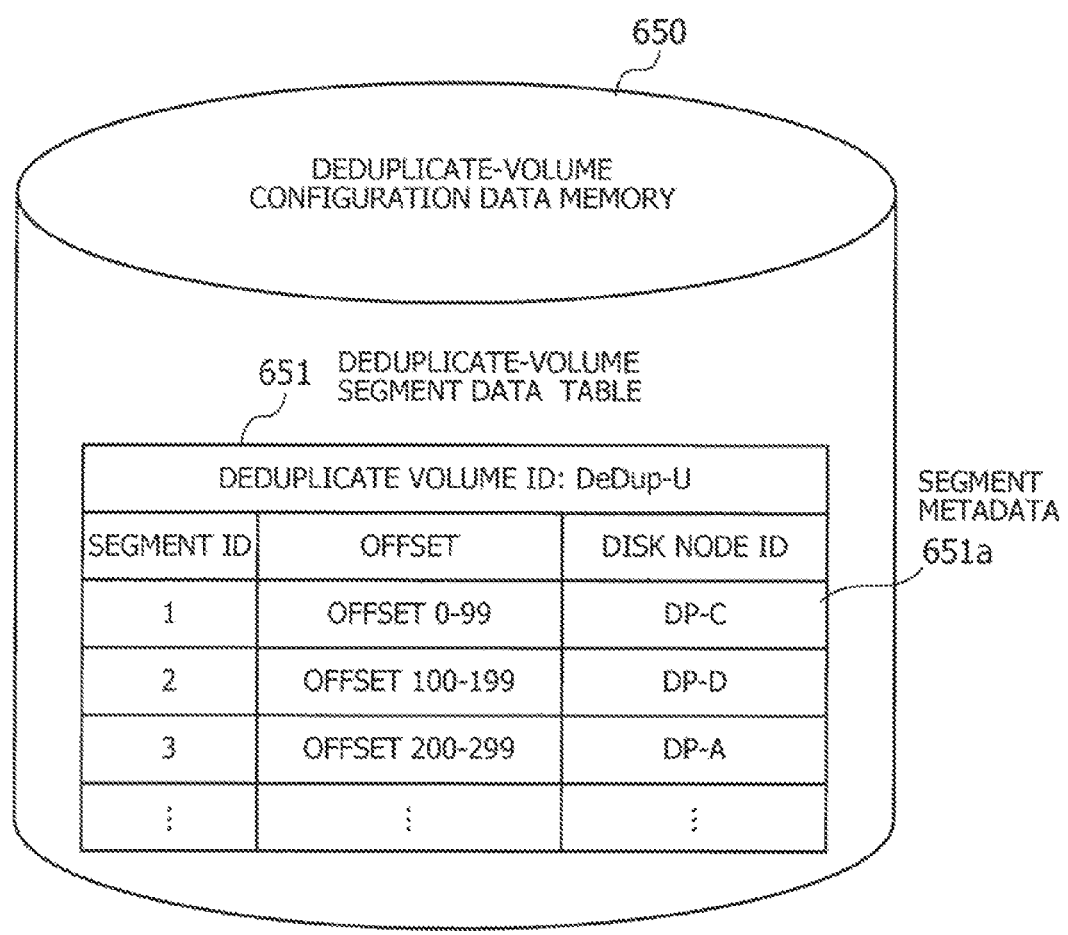
FIG. 11 illustrates an example data structure of a deduplicate-volume configuration data memory in the control node.

FIG. 11 illustrates an example data structure of the deduplicate-volume configuration data memory 650 in the control node 600. The illustrated deduplicate-volume configuration data memory 650 contains a deduplicate-volume segment data table 651 for a deduplicate volume. As seen, this deduplicate-volume segment data table 651 is labeled with a specific deduplicate volume ID, "DeDup-U." The deduplicate-volume segment data table 651 has the following data fields: "Segment ID," "Offset," and "Disk Node ID." The field values arranged in the horizontal direction are associated with each other and thus form a single piece of metadata describing each specific segment, which is referred to as a segment metadata 651a. These data fields of the deduplicate-volume segment data table 651 serve the same purposes as their respective counterparts in the foregoing logical-volume segment data table 641 of FIG. 10.

Figure 12:
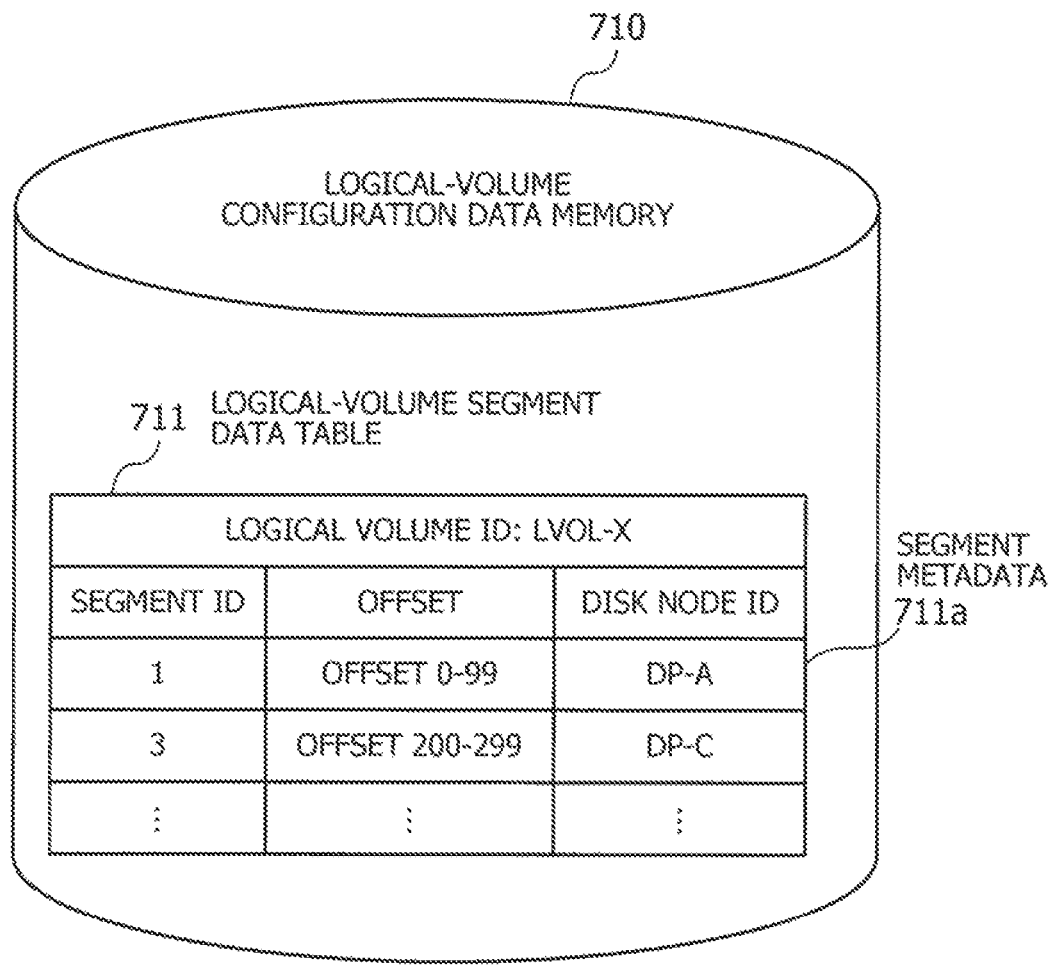
FIG. 12 illustrates an example data structure of a logical-volume configuration data memory in access nodes.

FIG. 12 illustrates an example data structure of a logical-volume configuration data memory in access nodes. The illustrated logical-volume configuration data memory 710 stores a logical-volume segment data table 711 corresponding to a logical volume that the access node 700 uses. As seen, the logical-volume segment data table 711 is labeled with a specific logical volume ID, "LVOL-X." The logical-volume segment data table 711 has the following data fields: "Segment ID," "Offset," and "Disk Node ID." The field values arranged in the horizontal direction are associated with each other and thus form a single piece of metadata describing each specific segment, which is referred to as a segment metadata 711a. Those data fields of the logical-volume segment data table 711 serve the same purposes as their respective counterparts in the foregoing logical-volume segment data table 641 of FIG. 10.

The logical-volume segment data table 711 may be used, for example, to only record metadata of the segments that the access node 700 accessed in the past. When this is the case, the data access request module 720 fetches relevant metadata from the control node 600 to execute access to a segment that is missing in the logical-volume segment data table 711. Or alternatively, the data access request module 720 may be configured collect metadata of every segment in a logical volume from the control node 600 when the access node 700 starts up, or at some other appropriate time. In that case, the logical-volume segment data table 711 is populated with metadata of every available segment, regardless of whether those segments have been accessed in the past.

The following section will describe the functions implemented in the disk nodes 100, 200, 300, and 400 and index server 500.

Figure 13:
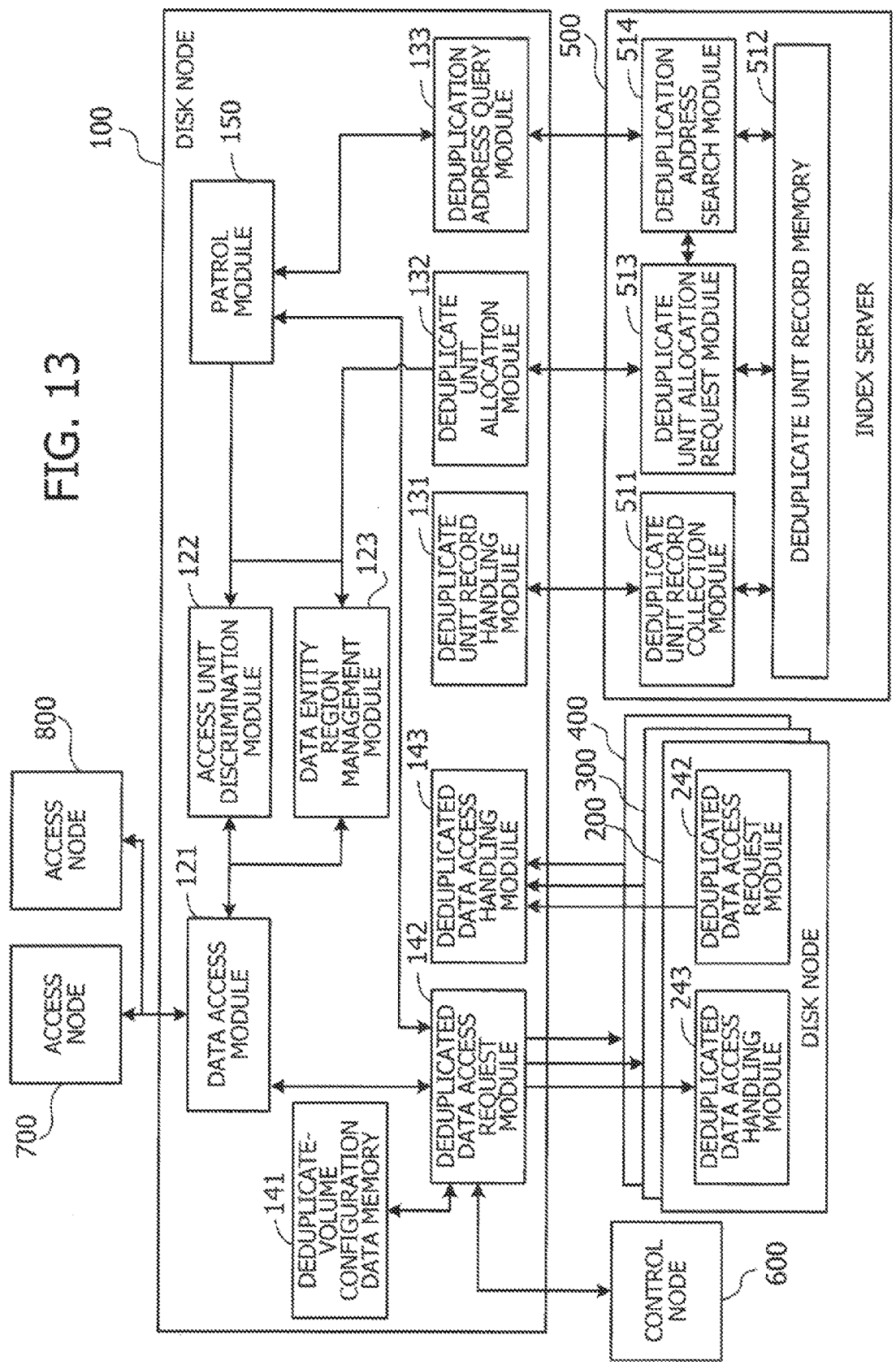
FIG. 13 is a functional block diagram of disk nodes and an index server.

FIG. 13 is a functional block diagram of disk nodes and an index server. The illustrated disk node 100 includes the following components: a data access module 121, an access unit discrimination module 122, a data entity region management module 123, a deduplicate unit record handling module 131, a deduplicate unit allocation module 132, a deduplication address query module 133, a deduplicate-volume configuration data memory 141, a deduplicated data access request module 142, a deduplicated data access handling module 143, and a patrol module 150. While FIG. 13 illustrates details of only one disk node 100, other disk nodes 200, 300, and 400 also have similar functions.

The data access module 121 executes read and write access to a logical volume when requested from access nodes 700 and 800. More specifically, the data access module 121 interacts with the access unit discrimination module 122 upon receipt of a data access request from access nodes 700 and 800, thus determining the state of the requested unit. For example, the requested unit may have a state of "Normal." In this case, the data access module 121 makes access to a relevant data unit stored in the storage device 110. In the case of "DeDup," the data access module 121 then relies on the functions of the deduplicated data access request module 142 to make access to a relevant deduplicate unit in the deduplicate volume which is linked from the requested unit.

In the case where the given data write access is destined for a new unit, the data access module 121 requests the data entity region management module 123 to allocate a data unit to store the specified data entity. The data access module 121 then executes a data write operation on the data unit newly allocated by the data entity region management module 123.

The access unit discrimination module 122 checks the state of a data unit when requested by the data access module 121 or patrol module 150. More specifically, the access unit discrimination module 122 consults logical-volume slice metadata to determine the state of a data unit at the specified access location in the specified logical volume. The resulting state information is then returned to the requesting data access module 121 or patrol module 150.

The data entity region management module 123 manages allocation and deallocation of a data entity region to/from units. The data entity region management module 123 also manages unused areas in the data entity region 110b, as part of the storage device 110 managed by the disk node 100. Management of unused areas means the act of managing the state of each constituent storage space belonging to the data entity region 110b in terms of whether the space is actually allocated to a unit described in slice metadata. In slice metadata, a management record gives a data entity offset of a specific unit, which locates the top of a storage space in the data entity region 110b. This storage space, with a length equivalent to a single unit, is allocated to the unit as its constituent storage space. For example, the data entity region management module 123 maintains a collection of flags each corresponding to a specific constituent storage space in the data entity region 110b. The data entity region management module 123 sets (i.e., gives a value of one to) one of those flags when its corresponding constituent storage space is registered with that slice metadata. When a constituent storage space has to be newly allocated for a unit, the data entity region management module 123 chooses a constituent storage space whose flag is not set (i.e., has a value of zero) for the unit and records the allocated space in the slice metadata.

The deduplicate unit record handling module 131 is activated by a deduplicate unit record request from the index server 500. More specifically, upon receipt of such a request, the deduplicate unit record handling module 131 retrieves deduplicate-volume slice metadata 61, 62, 63, . . . from the metadata region 110a. Then the deduplicate unit record handling module 131 sends the retrieved deduplicate-volume slice metadata 61, 62, 63, . . . back to the index server 500.

The deduplicate unit allocation module 132 invokes allocation of a constituent storage space in the data entity region 110b to a deduplicate unit, based on commands from the index server 500. More specifically, the deduplicate unit allocation module 132 receives a data entity region allocation request from the index server 500, which specifies a specific deduplicate unit in a slice corresponding to a segment of the deduplicate volume. In response, the deduplicate unit allocation module 132 requests the data entity region management module 123 to allocate a data entity region to the specified deduplicate unit. The data entity region management module 123 then selects an unused constituent storage space and allocates it to the deduplicate unit.

The deduplication address query module 133 produces a query for deduplication address (deduplicate volume ID and deduplicate offset) relevant to data specified by the patrol module 150. More specifically, the deduplication address query module 133 receives a hash value of the data from the patrol module 150 and sends the index server 500 a deduplication address request including the received hash value. The index server 500 then returns a deduplication address associated with the hash value. The deduplication address query module 133 passes this deduplication address to the patrol module 150.

The deduplicate-volume configuration data memory 141 stores deduplicate-volume configuration data. For example, this deduplicate-volume configuration data memory 141 may be implemented as part of the RAM 102 or HDD 103. Specifically, the deduplicate-volume configuration data memory 141 stores information similar to the deduplicate-volume segment data table 651 illustrated in FIG. 11. For example, the deduplicate-volume configuration data memory 141 in the disk node 100 stores metadata solely of the segments that have actually been accessed, while the deduplicate volume may have other segments. The deduplicate-volume configuration data memory 141 may also be configured to store metadata of all segments regardless of whether they have been accessed or not.

The deduplicated data access request module 142 requests a disk node to send data of a deduplicate unit managed by the disk node, according to a request from the data access module 121. To achieve this, the deduplicated data access request module 142 consults the deduplicate-volume configuration data memory 141 to determine which disk node manages the deduplicate unit in question. When, for example, the disk node 200 is requested to send data of its deduplicate unit, the deduplicated data access handling module 243 in that disk node 200 is supposed to respond to the data request.

The deduplicated data access request module 142 interacts with the control node 600 to obtain metadata of a segment accommodating the requested deduplicate unit, in the case where such relevant metadata is missing in the deduplicate-volume configuration data memory 141. The deduplicated data access request module 142 enters obtained metadata in the deduplicate-volume configuration data memory 141.

The deduplicated data access handling module 143 reads data of a deduplicate unit from the storage device 110 when so requested by other disk nodes 200, 300, and 400. The deduplicated data access handling module 143 then sends the data to the requesting disk node.

Suppose, for example, that one disk node 200 needs access to data of a deduplicate unit managed in another disk node 100. In this case, the deduplicated data access request module 242 in the former disk node 200 issues a data request to the disk node 100. In response, the deduplicated data access handling module 143 in the disk node 100 reads data and sends it to the deduplicated data access request module 242.

The patrol module 150 patrols the disk node 100 regularly. Specifically, the patrol module 150 patrols a slice upon expiration of a specified time since the recorded last patrol time of that slice. The patrol module 150 also patrols unused constituent storage spaces. That is, the patrol operation covers the information (including various metadata, data units, deduplicate units, and unused areas) in the storage device 110 under the disk node 100. More specifically, the patrol module 150 performs "read-and-write disk maintenance" on data units in the course of its patrol operation. Here the operation of "read-and-write disk maintenance" is to read data in question to confirm the data integrity, and then write the data back to its original location if no error is found.

The patrol module 150 also consults the access unit discrimination module 122 to determine the state of units to be patrolled and executes its tasks accordingly. When it is found that a patrolled unit has aged for a specified time after its last write operation, the patrol module 150 regards the unit as being deduplication-eligible and asks the deduplication address query module 133 to obtain a deduplication address of a deduplicate unit.

The patrol module 150 also performs read-and-write disk maintenance on deduplicate units in the course of its patrol operation. When it is found that a patrolled deduplicate unit has aged to exceed its retention time limit, the patrol module 150 clears the record of that deduplicate unit in deduplicate-volume slice metadata. Further, the patrol module 150 performs read-and-write disk maintenance on various metadata and unused storage areas in the course of its patrol operation.

The index server 500 includes the following components: a deduplicate unit record collection module 511, a deduplicate unit record memory 512, a deduplicate unit allocation request module 513, and a deduplication address search module 514.

The deduplicate unit record collection module 511 collects information about deduplicate units from each disk node 100, 200, 300, and 400. Take a disk node 100, for example. The deduplicate unit record collection module 511 sends a deduplicate unit record request to the deduplicate unit record handling module 131 in the disk node 100. In response, the deduplicate unit record handling module 131 returns deduplicate-volume slice metadata 61, 62, 63, . . . , which is read out of the disk node 100 under the management of the disk node 100. The deduplicate unit record collection module 511 then saves the collected information about deduplicate units (i.e., deduplicate-volume slice metadata) in the deduplicate unit record memory 512.

The deduplicate unit record memory 512 serves as a storage space for the information about deduplicate units (i.e., deduplicate-volume slice metadata) collected by the deduplicate unit record collection module 511. For example, this deduplicate unit record memory 512 may be implemented as part of RAM or HDD in the index server 500. It is noted to the deduplicate unit record memory 512 is used to store the information not only on deduplicate units in use, but also on unused deduplicate units.

The deduplicate unit allocation request module 513 sends a request to disk nodes 100, 200, 300, and 400 for allocation of a constituent storage space to a specific deduplicate unit when requested from the deduplication address search module 514. More specifically, the deduplicate unit allocation request module 513 identifies which slice accommodates the deduplicate unit selected by the deduplication address search module 514, and then requests a disk node managing the identified slice to allocate a constituent storage space. Upon receipt of a notice of constituent storage space allocation, the deduplicate unit allocation request module 513 informs the deduplication address search module 514 of the completion of allocation.

The deduplication address search module 514 handles deduplication address requests from disk nodes 100, 200, 300, and 400. When, for example, a deduplication address request including a specific hash value is received from the deduplication address query module 133 in the disk node 100, the deduplication address search module 514 searches the deduplicate unit record memory 512 to find a deduplicate unit record having the specified hash value. If the search finds a relevant deduplicate unit record, the deduplication address search module 514 sends the deduplication address (deduplicate volume ID and offset) in the found deduplicate unit record back to the deduplication address query module 133. If no relevant record is found, then the deduplication address search module 514 consults the deduplicate unit record memory 512 to select an unused deduplicate unit and requests the deduplicate unit allocation request module 513 to allocate a constituent storage space to the selected deduplicate unit. Subsequently the deduplication address search module 514 sends a newly created deduplication address back to the deduplication address query module 133 in the requesting disk node 100. The deduplication address search module 514 also updates an existing deduplicate unit record in the deduplicate unit record memory 512 which describes the selected deduplicate unit.

Figure 14:
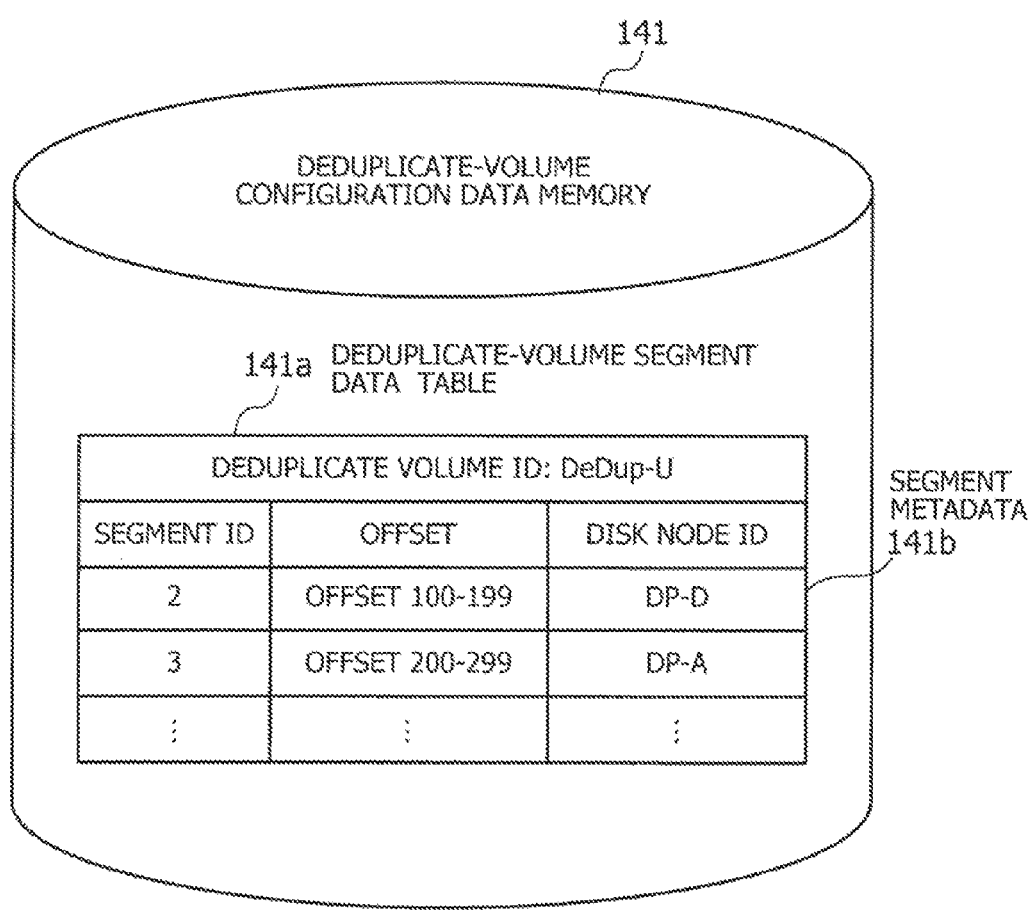
FIG. 14 illustrates an example data structure of a deduplicate-volume configuration data memory provided in disk nodes.

FIG. 14 illustrates an example data structure of a deduplicate-volume configuration data memory provided in disk nodes. The illustrated deduplicate-volume configuration data memory 141 stores a deduplicate-volume segment data table 141a. The data structure of this deduplicate-volume segment data table 141a is similar to that of the deduplicate-volume segment data table 651, which the control node 600 illustrated in FIG. 11 stores in its deduplicate-volume configuration data memory 650. The deduplicate-volume segment data table 141a contains, for example, metadata (segment metadata 141b) of only the segments accessed by disk nodes in the past.

Figure 15:
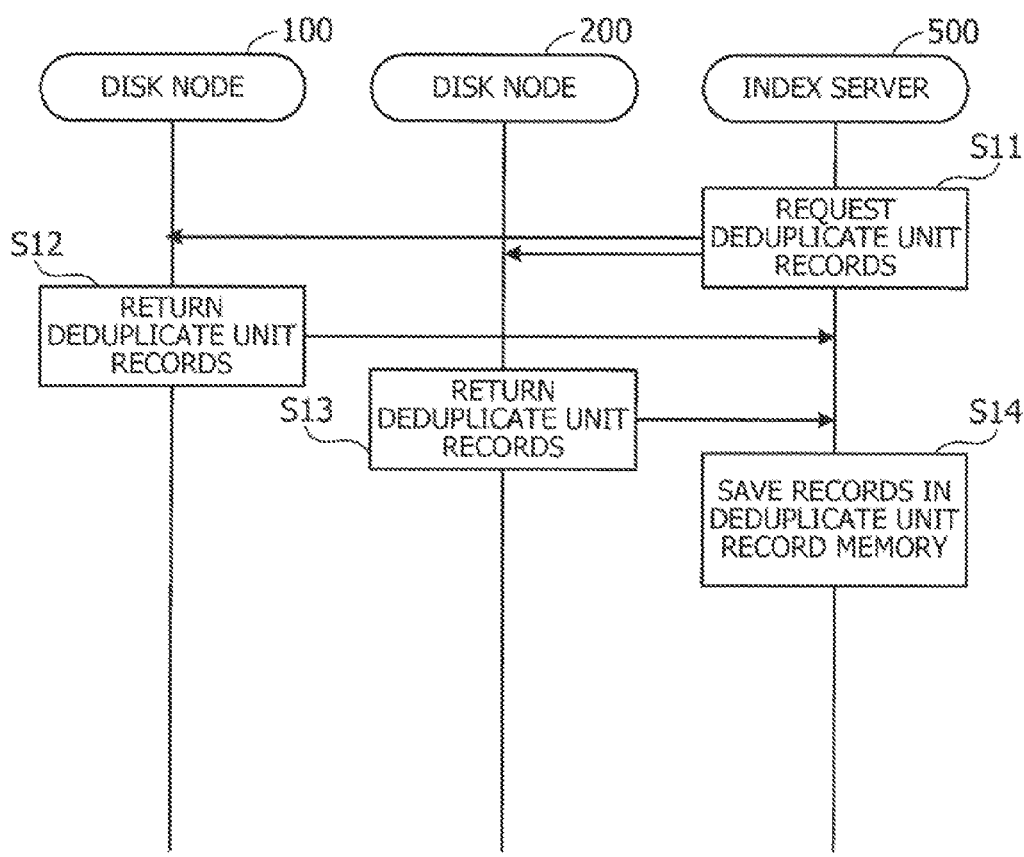
FIG. 15 is a sequence diagram illustrating a deduplicate unit record collection process.

When the system starts up with the above-described structure and configuration, the deduplicate unit record collection module 511 in the index server 500 collects deduplicate unit records. Deduplicate unit records reside in a metadata region of each storage device 110, 210, 310, and 410. FIG. 15 is a sequence diagram illustrating a deduplicate unit record collection process. While FIG. 15 assumes the case of two disk nodes 100 and 200 and one index server 500, the illustrated process similarly applies between other disk nodes 300 and 400 and the index server 500. Each step of FIG. 15 will be described below in the order of step numbers.

(Step S11) Upon start up of the index server 500, the deduplicate unit record collection module 511 requests all disk nodes 100, 200, 300, and 400 to send their deduplicate unit records.

(Step S12) The deduplicate unit record handling module 131 in the disk node 100 returns its deduplicate unit records back to the index server 500. Specifically, the deduplicate unit record handling module 131 retrieves deduplicate-volume slice metadata 61, 62, 63, . . . containing deduplicate unit records from metadata region 110a of the local storage device 110. The deduplicate unit record handling module 131 then sends the retrieved deduplicate-volume slice metadata 61, 62, 63, . . . back to the index server 500.

(Step S13) Another disk node 200 responds to the index server 500 with its deduplicate-volume slice metadata containing deduplicate unit records, just as does the disk node 100. Likewise, other disk nodes 300 and 400 (not illustrated) also send their deduplicate-volume slice metadata to the index server 500.

(Step S14) In the index server 500, the deduplicate unit record collection module 511 saves the deduplicate unit records received from the disk nodes 100, 200, 300, and 400, in the deduplicate unit record memory 512.

The above-described steps permit the index server 500 to collect information on deduplicate units and store the collected information in the deduplicate unit record memory 512.

Figure 16:
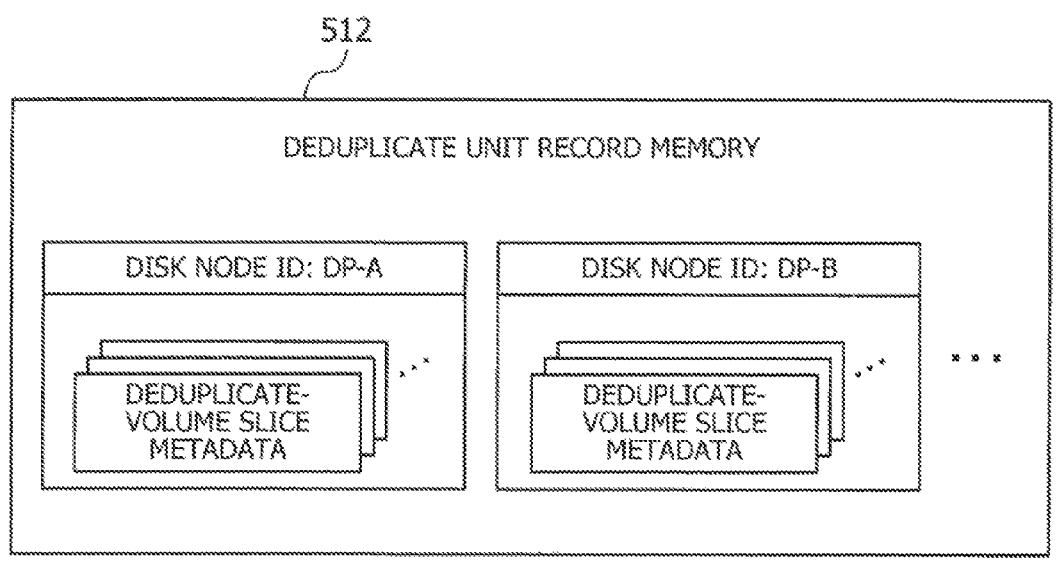
FIG. 16 illustrates an example data structure of a deduplicate unit record memory.

FIG. 16 illustrates an example data structure of the deduplicate unit record memory 512. The deduplicate unit record memory 512 stores deduplicate-volume slice metadata collected from disk nodes, together with disk node IDs indicating their source disk nodes. See FIG. 7 for details of deduplicate-volume slice metadata. Briefly, each deduplicate unit record is formed from data entity offset, hash value, and retention time limit of a deduplicate unit, in addition to a deduplicate volume ID.

The deduplicate-volume slice metadata stored in the deduplicate unit record memory 512 is searched with a given hash value used as a search key, so as to find a relevant deduplicate unit record. This search permits the index server 500 to determine whether the source data of the hash value is under deduplication. The deduplication address search module 514 may be configured to perform the above hash value search by using, for example, a combination of hash table and tree-structured data.

The deduplicate unit record memory 512 is the place to find an unused deduplicate unit. Unused deduplicate units are marked "NULL" in deduplicate-volume slice metadata. The deduplicate unit allocation request module 513 scans the deduplicate unit record memory 512 to find such an unused deduplicate unit and issues a request for allocation of the found deduplicate unit to new deduplication target data. The deduplicate unit allocation request module 513 may use a queue to manage a pool of unused deduplicate units. More specifically, the queue is organized as a series of pointers each pointing to a deduplicate unit record representing an unused deduplicate unit, and the deduplicate unit allocation request module 513 puts a newly found unused deduplicate unit into the queue by appending its pointer. When the need arises for allocation of a deduplicate unit to deduplication target data, the deduplicate unit allocation request module 513 selects a deduplicate unit indicated by the topmost pointer in the queue. It is noted that an existing deduplicate unit in use may return to the unused state. When this occurs, the deduplicate unit allocation request module 513 adds such a deduplicate unit to the queue by appending a pointer that points to its corresponding deduplicate unit record.

At the time of system startup, the slice metadata collection module 610 in the control node 600 collects logical-volume slice metadata and deduplicate-volume slice metadata, and the logical volume management module 630 creates logical-volume configuration data and deduplicate-volume configuration data. Access nodes 700 and 800 may access data in a segment of a logical volume right after the system startup. In that case, they first have to obtain segment metadata from the control node 600. The access nodes 700 and 800 use the obtained segment metadata to determine which disk node manages the data of interest, thus obtaining a disk node ID for use in data access.

Similarly to the above, the disk nodes 100, 200, 300, and 400 may access each other's local deduplication target data right after the system startup. In that case, they first have to consult the control node 600 to obtain segment metadata of a segment relevant to the data of interest. The disk nodes 100, 200, 300, and 400 use the obtained segment metadata to determine which disk node manages the data, thus obtaining a disk node ID for use in data access.

Read Operation

Figure 17:
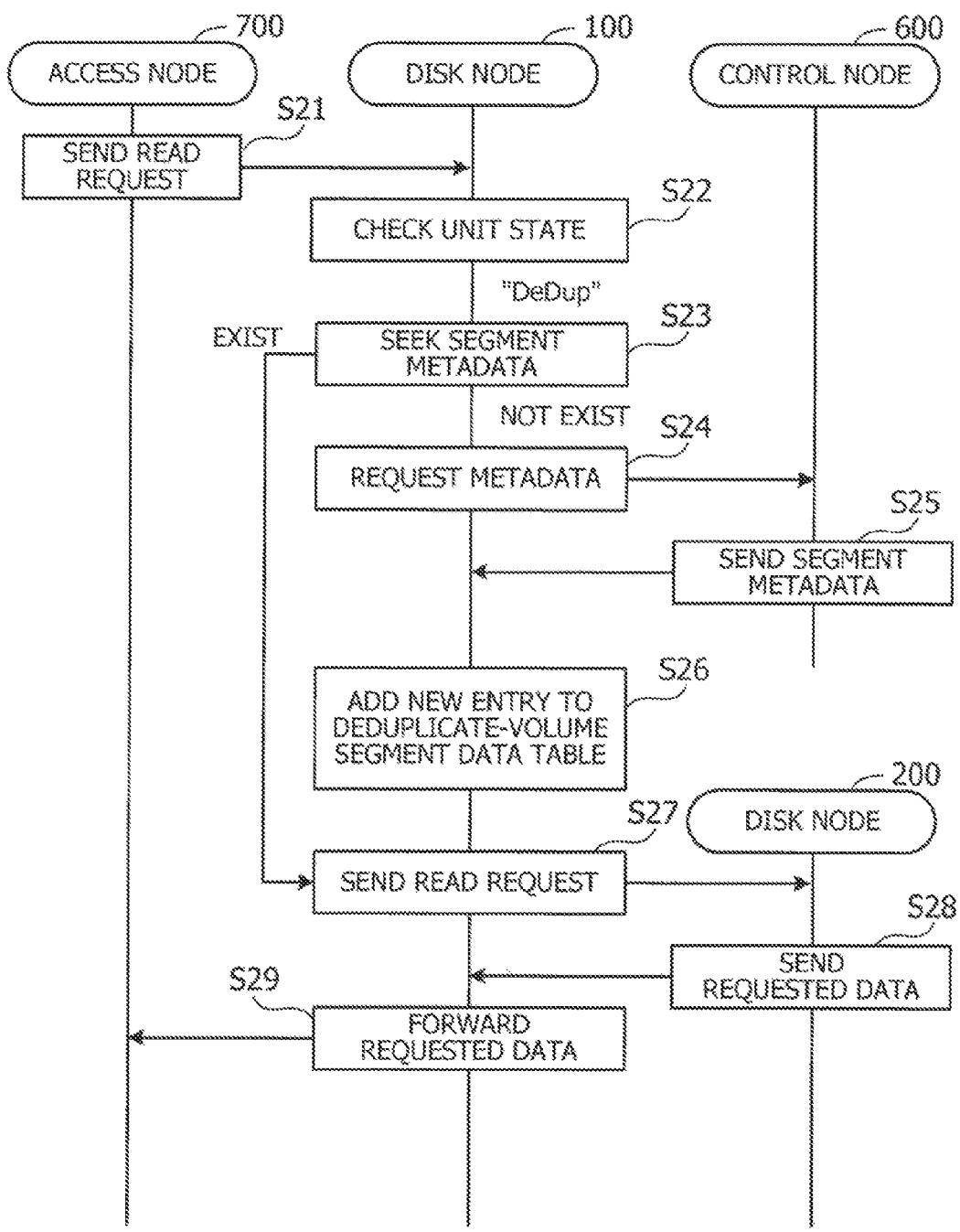
FIG. 17 is a sequence diagram illustrating a procedure of reading data from a deduplicate volume.

This section describes how the system handles a data read request. FIG. 17 is a sequence diagram illustrating a procedure of reading data from a deduplicate volume. Each step of FIG. 17 will be described below in the order of step numbers.

(Step S21) The data access request module 720 in one access node 700 sends a read request to a disk node 100. This read request contains, for example, a specific logical volume ID and the offset and size of requested data in the specified logical volume.

(Step S22) In the disk node 100, the data access module 121 receives the read request and interacts with the access unit discrimination module 122 to determine the state of a unit that contains the requested data. The access unit discrimination module 122 determines the state of the unit in question by consulting relevant logical-volume slice metadata.

More specifically, the read request contains a logical volume ID indicating a particular logical volume. The access unit discrimination module 122 thus extracts logical-volume slice metadata relevant to a slice that is allocated to that logical volume. Here each chunk of logical-volume slice metadata contains a particular segment ID. Since the storage capacity of one segment is fixed (e.g., 1 GB), the range (e.g., beginning offset and ending offset) of storage space of a segment corresponding to a particular slice can be determined from its segment ID. Accordingly, the access unit discrimination module 122 identifies a segment accommodating a region determined from the offset and data size in the read request and then extracts logical-volume slice metadata of a slice allocated to the identified segment. The access unit discrimination module 122 then searches the extracted logical-volume slice metadata to find and select a data unit record relevant to the data unit accommodating the data of interest. The selected data unit record contains state information of the data unit, which permits the access unit discrimination module 122 to determine the state of the unit. The access unit discrimination module 122 informs the data access module 121 of the determination result.

The example sequence of FIG. 17 assumes here that the data unit record has a value of "DeDup" in its state field, meaning that the data of interest has already been managed in a deduplicate volume as deduplication target data. Because of the DeDup state, the data unit record contains a deduplicate volume ID and a deduplicate offset of a specific deduplicate unit. Accordingly, the data access module 121 issues an access request to the deduplicated data access request module 142 to execute access to the deduplicate unit.

(Step S23) Now that a data unit record relevant to the read request is found and selected, the deduplicated data access request module 142 retrieves segment metadata from the deduplicate-volume segment data table 141a (see FIG. 14), based on a deduplicate volume ID and deduplicate offset specified in the selected data unit record. More specifically, the specified deduplicate volume ID permits the deduplicated data access request module 142 to extract a corresponding deduplicate-volume segment data table 141a in the deduplicate-volume configuration data memory 141. The deduplicated data access request module 142 then searches the extracted deduplicate-volume segment data table 141a to find segment metadata that contains the specified deduplicate offset. If relevant segment metadata is found, the process proceeds to step S27. If there is no relevant segment metadata, the process proceeds to step S24.

(Step S24) The deduplicated data access request module 142 sends a metadata request to the control node 600. This metadata request includes, for example, a deduplicate offset specified in the selected data unit record.

(Step S25) The logical volume management module 630 in the control node 600 returns requested segment metadata. More specifically, the logical volume management module 630 consults a deduplicate-volume segment data table 651 stored in the deduplicate-volume configuration data memory 650 to extract segment metadata of a segment specified by the metadata request. For example, in the case where the metadata request specifies a particular deduplicate offset, the logical volume management module 630 extracts segment metadata whose offset range contains the value of the specified deduplicate offset and sends the extracted segment metadata to the disk node 100.

(Step S26) The deduplicated data access request module 142 in the disk node 100 registers the received segment metadata as a new entry of the deduplicate-volume segment data table 141a in the deduplicate-volume configuration data memory 141.

(Step S27) The deduplicated data access request module 142 sends a read request for deduplication target data to the disk node managing that data (e.g., to the disk node 200 in the example sequence of FIG. 17). More specifically, the deduplicated data access request module 142 determines which disk node is managing the deduplication target data, based on the segment metadata obtained through the processing at steps S23 to S26. The deduplicated data access request module 142 then sends a read request the determined disk node 200. This request specifies a deduplicate volume ID to indicate a deduplicate volume accommodating the deduplication target data, together with a deduplicate offset. Here the deduplicate volume ID and deduplicate offset is obtained from the data unit record selected at step S22.

(Step S28) In response to the read request, the deduplicated data access handling module 243 in the disk node 200 sends the requested deduplication target data back to the requesting disk node 100. More specifically, the deduplicated data access handling module 243 makes access to the storage device 210 to retrieve deduplicate-volume slice metadata having the deduplicate volume ID specified in the received read request. The read request also specifies a deduplicate offset, which permits the deduplicated data access handling module 243 to identify a particular deduplicate unit. The deduplicated data access handling module 243 then extracts a deduplicate unit record of that unit from the retrieved deduplicate-volume slice metadata. The extracted deduplicate unit record contains a data entity offset, which indicates a constituent storage space in the data entity region of the storage device 210. The deduplicated data access handling module 243 reads out deduplication target data from the indicated constituent storage space and sends the read data to the requesting disk node 100.

(Step S29) In the disk node 100, the deduplicated data access request module 142 receives deduplication target data from the disk node 200 and passes it to the data access module 121. The data access module 121 forwards the data to the access node 700 as a response to its read request.

A data read operation is executed in the way described above. During this course, the state of a unit containing the requested data is tested, and if it is "DeDup," the data is read out of a disk node which manages the corresponding deduplication target data. In the example sequence of FIG. 17, this deduplication target data is actually provided not from the disk node 100 that has accepted a read request of the access node 700, but from a different disk node 200. In the case where the disk node 100 manages the deduplication target data, the deduplicated data access request module 142 reads it out of the local storage device 110.

While the example sequence of FIG. 17 illustrates the case of DeDup state, the unit state may take another value. In the case of "Blank" state, the data access module 121 returns a value of zero to the requesting access node 700. In the case of "Normal" state, the data unit record contains a specific data entity offset. This offset permits the data access module 121 to locate a constituent storage space allocated to the data unit in question. The data access module 121 reads data from the constituent storage space and sends it to the requesting access node 700.

Data Write Operation

Figure 18:
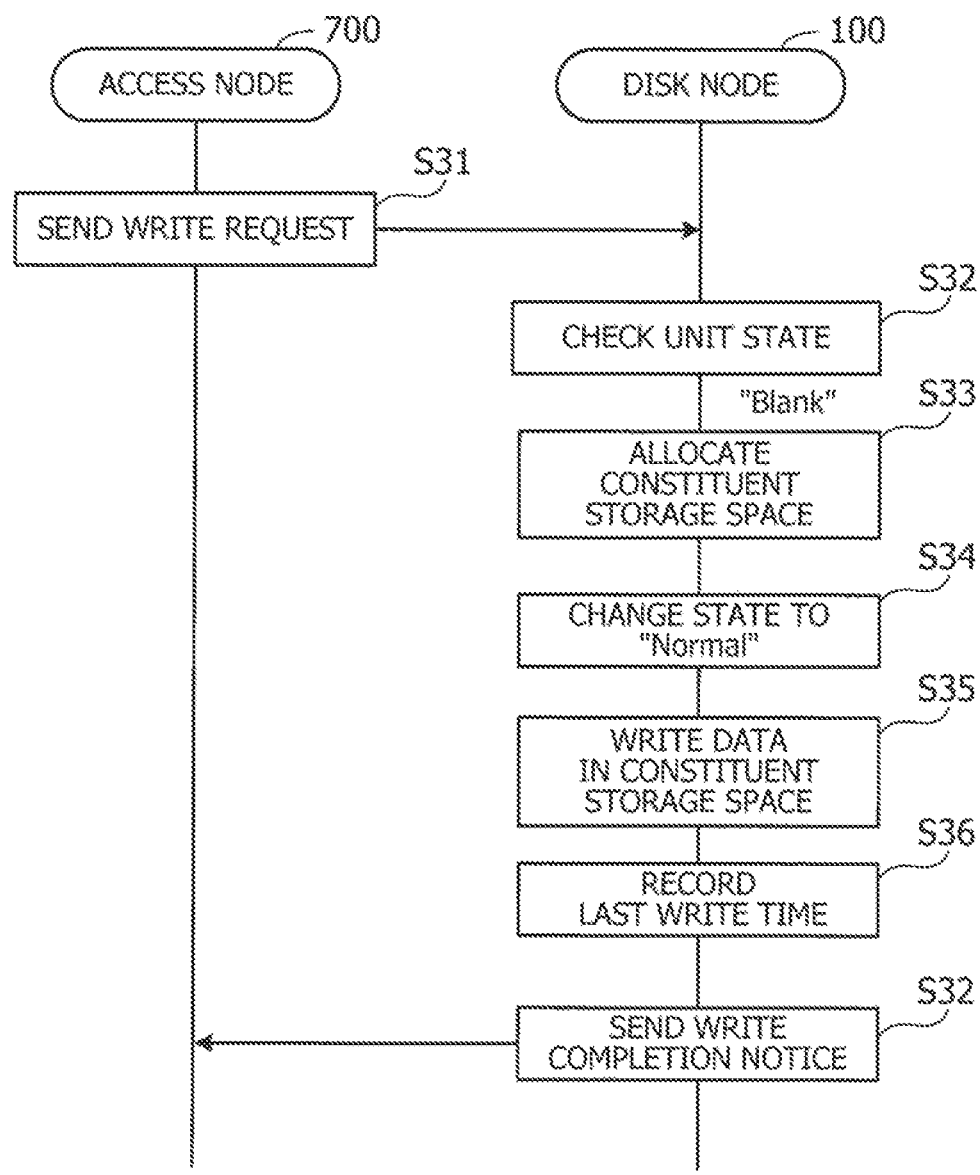
FIG. 18 is a sequence diagram illustrating a write operation on a data unit in Blank state.

This section describes how the system handles a data write request. FIG. 18 is a sequence diagram illustrating a write operation on a data unit in Blank state. Each step of FIG. 18 will be described below in the order of step numbers.

(Step S31) The access node 700 sends a write request from its data access request module 720 to a disk node 100. This write request contains, for example, a logical volume ID, an offset, and write data. The offset specifies the location of write data relative to the top of the specified logical volume.

(Step S32) The disk node 100 receives the write request at its data access module 121. Upon receipt, the data access module 121 requests the access unit discrimination module 122 to determine the state of a data unit for which the write data is destined, thus receiving the unit state information. For details of this operation, see the description of step S22 of FIG. 17. The example sequence of FIG. 18 assumes that the data unit in question is in Blank state.

(Step S33) The data access module 121 requests the data entity region management module 123 to allocate a constituent storage space in the data entity region. The data entity region management module 123 thus selects an unused constituent storage space among those in the data entity region 110b of the storage device 110 and allocates it to the destination data unit. That is, the data entity region management module 123 updates the logical-volume slice metadata by populating the data unit record for the destination data unit with a data entity offset representing the location of the selected constituent storage space.

(Step S34) The data access module 121 changes the state of the destination data unit to "Normal" by modifying its data unit record.

(Step S35) The data access module 121 writes the write data in the allocated constituent storage space in the data entity region 110b.

(Step S36) The data access module 121 records the current time in the data unit record of the destination data unit as its last write time.

(Step S37) The data access module 121 sends a write completion notice to the access node 700.

The above-described steps execute a data write operation to a data unit in Blank state.

Figure 19:
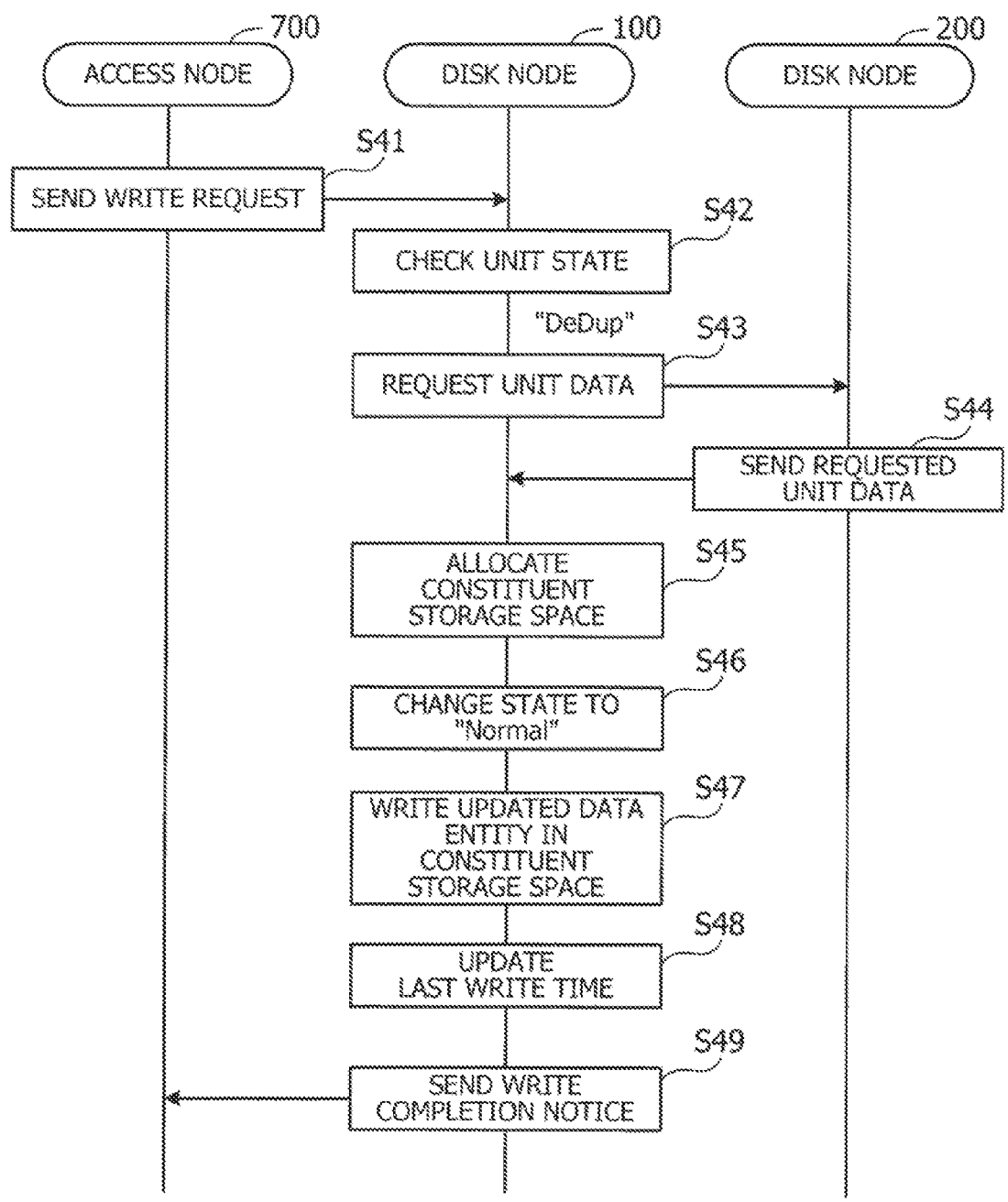
FIG. 19 is a sequence diagram illustrating a write operation on a data unit in DeDup state.

FIG. 19 is a sequence diagram illustrating a write operation on a data unit in DeDup state. Each step of FIG. 19 will be described below in the order of step numbers.

(Step S41) The access node 700 sends a write request from its data access request module 720 to a disk node 100.

(Step S42) The disk node 100 receives the write request at its data access module 121. Upon receipt, the data access module 121 requests the access unit discrimination module 122 to determine the state of a data unit for which the write data is destined, thus receiving the result. Here the example sequence of FIG. 19 assumes that the destination data unit is in DeDup state. It is also assumed that the write data is not for the entire data unit, but for a part of the destination data unit.

(Step S43) The data access module 121 causes the deduplicated data access request module 142 to send a read request for deduplication target data to the disk node managing that data (e.g., to the disk node 200 in the example sequence of FIG. 19). For details of this processing, see the description of step S27 of FIG. 17.

(Step S44) In response to the read request, the deduplicated data access handling module 243 in the disk node 200 sends the requested deduplication target data back to the requesting disk node 100. For details of this processing, see the description of step S28 of FIG. 17.

(Step S45) In the disk node 100, the deduplicated data access request module 142 receives deduplication target data from the disk node 200 and passes it to the data access module 121. The data access module 121 requests the data entity region management module 123 to allocate a constituent storage space in the data entity region. The data entity region management module 123 thus selects an unused constituent storage space among those in the data entity region 110b of the storage device 110 and allocates it to the destination data unit.

(Step S46) The data access module 121 changes the state of the destination data unit to "Normal" by modifying its data unit record.

(Step S47) The data access module 121 modifies the received deduplication target data in accordance with the write request and writes the resulting data entity into the constituent storage space in the data entity region 110b, which has been allocated to the destination data unit.

(Step S48) The data access module 121 records the current time in the data unit record of the destination data unit as its last write time.

(Step S49) The data access module 121 sends a write completion notice to the access node 700.

The above-described steps execute a data write operation on a data unit in DeDup state. While the above description of FIGS. 18 and 19 has exemplified data units in "Blank" or "DeDup," the write operation may also take place on a data unit in Normal state, in which case the destination data unit has already been allocated a constituent storage space in a data entity region. The write operation is performed on this constituent storage space.

A data unit in DeDup state may be subjected to a write operation that overwrites the whole of the data unit. In this case, there is no need to read the existing data under deduplication before writing new data. The next section will describe how a disk node executes a write operation, including the steps of testing such conditions.

Figure 20:
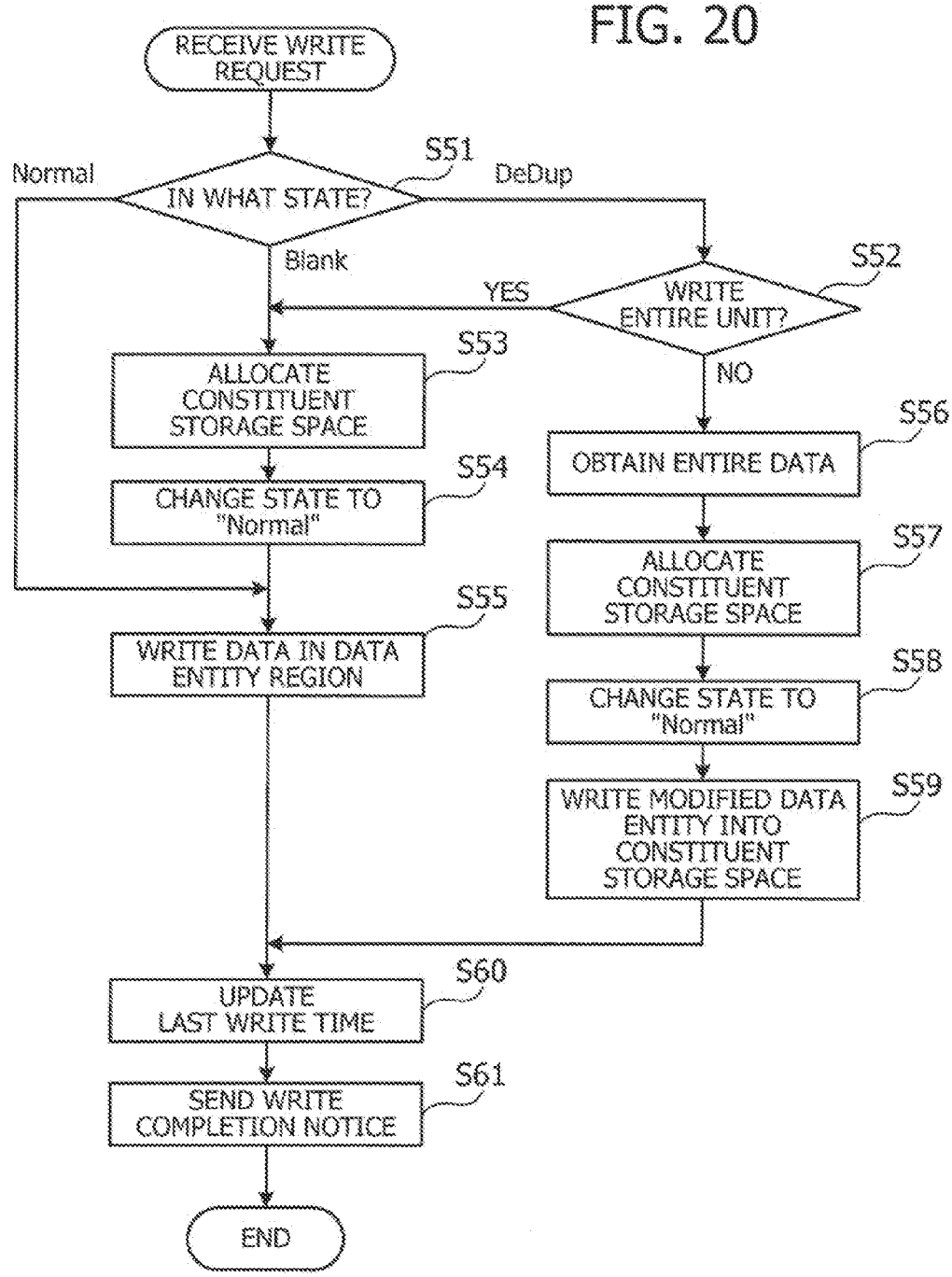
FIG. 20 is a flowchart of a write operation in a disk node.

FIG. 20 is a flowchart of a write operation in a disk node. The illustrated process is executed by a disk node 100 when it receives a write request from an access node 700. Each step of FIG. 20 will be described below in the order of step numbers.

(Step S51) The data access module 121 determines the state of the destination data unit by using functions of the access unit discrimination module 122. In the case where the state is found to be "Normal," the process proceeds to step S55. In the case of "Blank," the process proceeds to step S53. In the case of "DeDup," the process proceeds to step S52.

(Step S52) The data access module 121 determines whether the write data is for the entire unit. If it is, the process advances to step S53. If not, the process proceeds to step S56.

(Step S53) The data access module 121 requests the data entity region management module 123 to allocate a constituent storage space in the data entity region to the destination data unit. The data entity region management module 123 thus selects an unused constituent storage space among those in the data entity region 110b and allocates it to the destination data unit.

(Step S54) The data access module 121 changes the state of the destination data unit to "Normal" by modifying its data unit record.

(Step S55) The data access module 121 writes the write data given in the write request to the allocated constituent storage space in the data entity region 110b. The process then proceeds to step S60.

(Step S56) Via the deduplicated data access request module 142, the data access module 121 obtains the entire data unit of deduplication target data.

(Step S57) The data access module 121 requests the data entity region management module 123 to allocate a constituent storage space to the destination data unit. The data entity region management module 123 thus selects an unused constituent storage space among those in the data entity region 110b and allocates it to the destination data unit.

(Step S58) The data access module 121 changes the state of the destination data unit to "Normal" by modifying its data unit record.

(Step S59) The data access module 121 modifies relevant part of the obtained deduplication target data in accordance with the write request. The data access module 121 then writes the resulting data entity in the constituent storage space in the data entity region 110b, which has been allocated to the destination data unit.

(Step S60) The data access module 121 records the current time in the data unit record of the destination data unit as its last write time.

(Step S61) The data access module 121 sends a write completion notice to the access node 700.

The above processing steps execute a write operation in various ways depending on the current state of the destination data unit.

Patrol Operation

This section describes details of patrol operations. The system executes a patrol operation to detect data qualified for deduplication by observing data units in each logical volume and move such deduplication target data to a deduplicate volume. The patrol operation also watches existing deduplicate units in each deduplicate volume to find and remove obsolete deduplicate units that have lost their association with data units in logical volumes. The patrol operation is invoked at predetermined intervals, with a coverage over data units in each slice, as well as over unused constituent storage spaces in the data entity region 110b.

Figure 21:
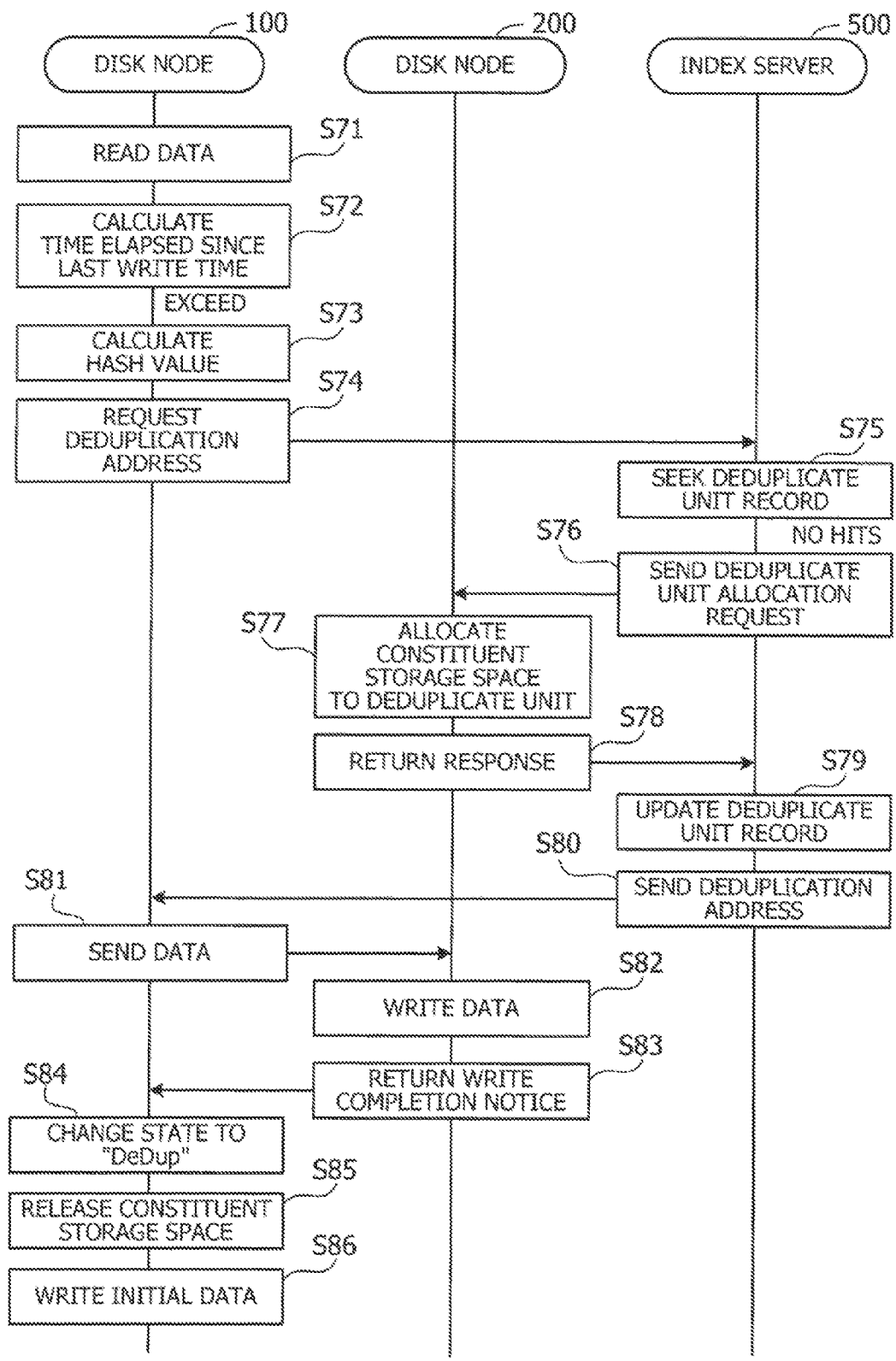
FIG. 21 is a sequence diagram illustrating a patrol operation on data units in Normal state.

FIG. 21 is a sequence diagram illustrating an example patrol operation performed on data units in Normal state, particularly on those in a slice. Each step of FIG. 21 will be described below in the order of step numbers.

(Step S71) The patrol module 150 reads a data entity out of a constituent storage space allocated to a data unit being patrolled.

(Step S72) The patrol module 150 determines how much time has passed since the last write time. More specifically, the patrol module 150 examines the data unit record of the data unit in question, finds therein a record of last write time, and calculates a time difference from the last write time to the current time. Then the patrol module 150 determines whether the elapsed time exceeds a predetermined deduplication grace period. If so, then it means that the data unit in question has been accessed less frequently, and the patrol module 150 recognizes the data stored in the data unit as deduplication target data. It is assumed in the example sequence of FIG. 21 that the calculated elapsed time exceeds the deduplication grace period.

(Step S73) The patrol module 150 calculates a hash value of the data read out at step S71, by using a predetermined hash function.

(Step S74) The patrol module 150 requests the index server 500 to provide a deduplication address. More specifically, the patrol module 150 requests the deduplication address query module 133 to send a deduplication address request including the hash value calculated at step S73. The deduplication address query module 133 thus sends such a deduplication address request to the index server 500.

(Step S75) In the index server 500, the deduplication address search module 514 searches the deduplicate unit record memory 512 to find a deduplicate unit record that has the hash value specified in the received deduplication address request. It is assumed in the example sequence of FIG. 21 that no relevant deduplicate unit record is registered, and thus the search ends up with no hits.

(Step S76) The deduplication address search module 514 in the index server 500 selects an unused deduplicate unit by consulting the deduplicate unit record memory 512 and requests the deduplicate unit allocation request module 513 to allocate a constituent storage space to the selected deduplicate unit. Accordingly, the deduplicate unit allocation request module 513 identifies which slice accommodates the selected deduplicate unit and requests the disk node (disk node 200 in the example of FIG. 21) managing the identified slice to allocate its constituent storage space.

(Step S77) In response to the request from the index server 500, the disk node 200 allocates a constituent storage space to the deduplicate unit.

(Step S78) The disk node 200 returns a completion notice of allocation of a constituent storage space to the specified deduplicate unit.

(Step S79) In the index server 500, the deduplicate unit allocation request module 513 forwards the completion notice to the deduplication address search module 514. The deduplication address search module 514 thus updates a relevant deduplicate unit record in the deduplicate unit record memory 512 to reflect the fact that the deduplicate unit has been allocated a constituent storage space. The updated deduplicate unit record contains at least the hash value sent from the disk node 100.

(Step S80) The deduplication address search module 514 sends a deduplication address (logical volume ID and deduplicate offset) back to the disk node 100. In this course, the deduplication address search module 514 puts an additional piece of information to the deduplication address to indicate that a deduplicate unit allocation process has been executed (steps S76 to S79).

(Step S81) In the disk node 100, the deduplication address query module 133 supplies the patrol module 150 with the deduplication address received from the index server 500. The patrol module 150 finds that a deduplicate unit allocation process has been executed, thus requesting the deduplicated data access request module 142 to write the deduplication target data as specified in the received deduplication address. Accordingly, the deduplicated data access request module 142 sends deduplication target data to the disk node 200, together with a deduplicate offset to specify the write location.

(Step S82) The disk node 200 receives the deduplication target data from the disk node 100, and the deduplicated data access handling module 243 writes the received data in the constituent storage space allocated to a deduplicate unit corresponding to the specified deduplication offset. During this course, the deduplicated data access handling module 243 gives a specific retention time limit to the deduplicate unit record of the deduplicate unit of interest. This retention time limit is obtained by adding a predetermined retention period to the current time.

(Step S83) The deduplicated data access handling module 243 in the disk node 200 returns a write completion notice to the disk node 100.

(Step S84) In the disk node 100, the deduplicated data access request module 142 notifies the patrol module 150 of the completion of data write operation. In response, the patrol module 150 changes the state of the data unit where the deduplication target data was originally stored, from "Normal" to "DeDup" by modifying relevant part of its data unit record.

(Step S85) The patrol module 150 releases the constituent storage space which has been allocated in the data entity region 110b for the data unit where the deduplication target data was originally stored. More specifically, the data unit record of that data unit is modified in such a way that the values of last write time and data entity offset fields are deleted and replaced with the deduplication address (i.e., deduplicate volume ID and deduplicate offset) provided at step S80.

(Step S86) The patrol module 150 writes initial data in the released constituent storage space in the data entity region 110b.

The above-described processing steps move data from a logical volume to a deduplicate volume as new deduplication target data when the data has undergone no write operations for more than a predetermined deduplication grace period.

It is noted here that, in the example of FIG. 21, the deduplicate unit allocation process of steps S76 to S79 is caused by the result of step S75, i.e., no registration of a relevant deduplicate unit. The execution of this deduplicate unit allocation process leads to a data transfer operation at steps S81 to S82. Actually, however, the search at step S75 may find a relevant deduplicate unit record. When this is the case, neither the deduplicate unit allocation process nor the data transfer from disk node 100 to disk node 200 is executed.

Figure 22:
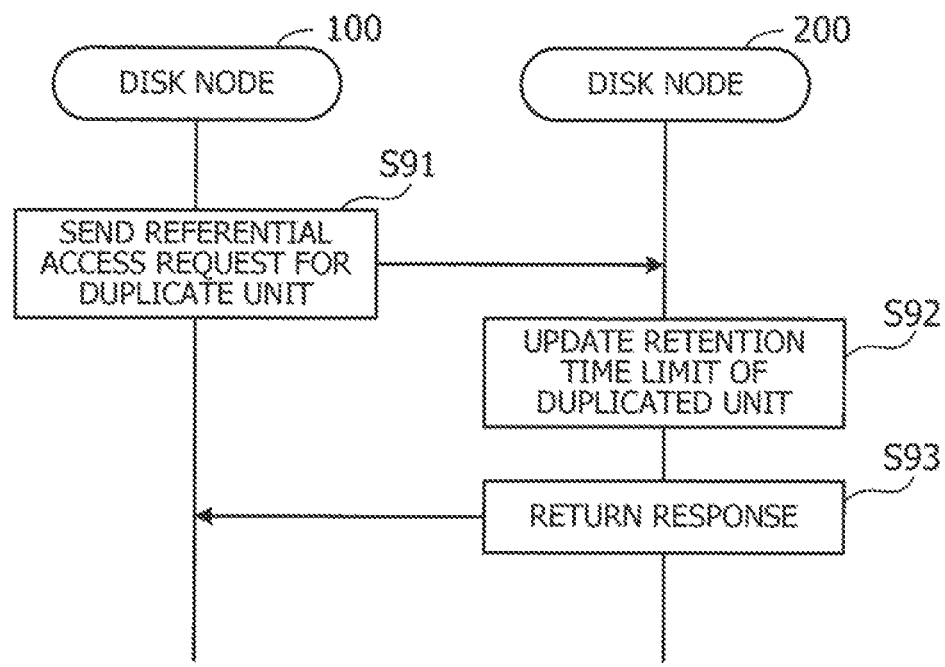
FIG. 22 is a sequence diagram illustrating a patrol operation on data units in DeDup state.

FIG. 22 is a sequence diagram illustrating a patrol operation on data units in DeDup state. Each step of FIG. 22 will be described below in the order of step numbers.

(Step S91) In the disk node 100, the patrol module 150 patrols a constituent storage space and finds that it is allocated to a data unit in DeDup state. The patrol module 150 then requests the deduplicated data access request module 142 to make referential access to corresponding deduplication target data. In response, the deduplicated data access request module 142 sends a referential access request for the deduplication target data to the disk node 200 managing that data.

(Step S92) In the disk node 200, the deduplicated data access handling module 243 reads the deduplication target data in response to the referential access request. During this course, the deduplicated data access handling module 243 updates the retention time limit of a deduplicate unit containing the deduplication target data with a new retention time limit calculated by adding a predetermined retention period to the current time.

(Step S93) The deduplicated data access handling module 243 sends the retrieved deduplication target data to the requesting disk node 100.

The above-described processing steps update the retention time limit of a deduplicate unit containing deduplication target data each time the disk node patrols the corresponding data unit in DeDup state. The interval of patrol operations is shorter than the retention period of deduplication target data. It is therefore ensured that the deduplication target data in a deduplicate unit is not removed as long as there remains at least one data unit whose deduplicate offset points to the deduplicate unit.

The following description will provide further details on how the patrol module 150 achieves the above-described patrol operation. A patrol operation on constituent storage spaces allocated to units belonging to the same slice is initiated a predetermined time (patrol interval) after the last patrol time of that slice. When the entire slice is patrolled, the patrol module 150 updates last patrol time of the slice.

Figure 23:
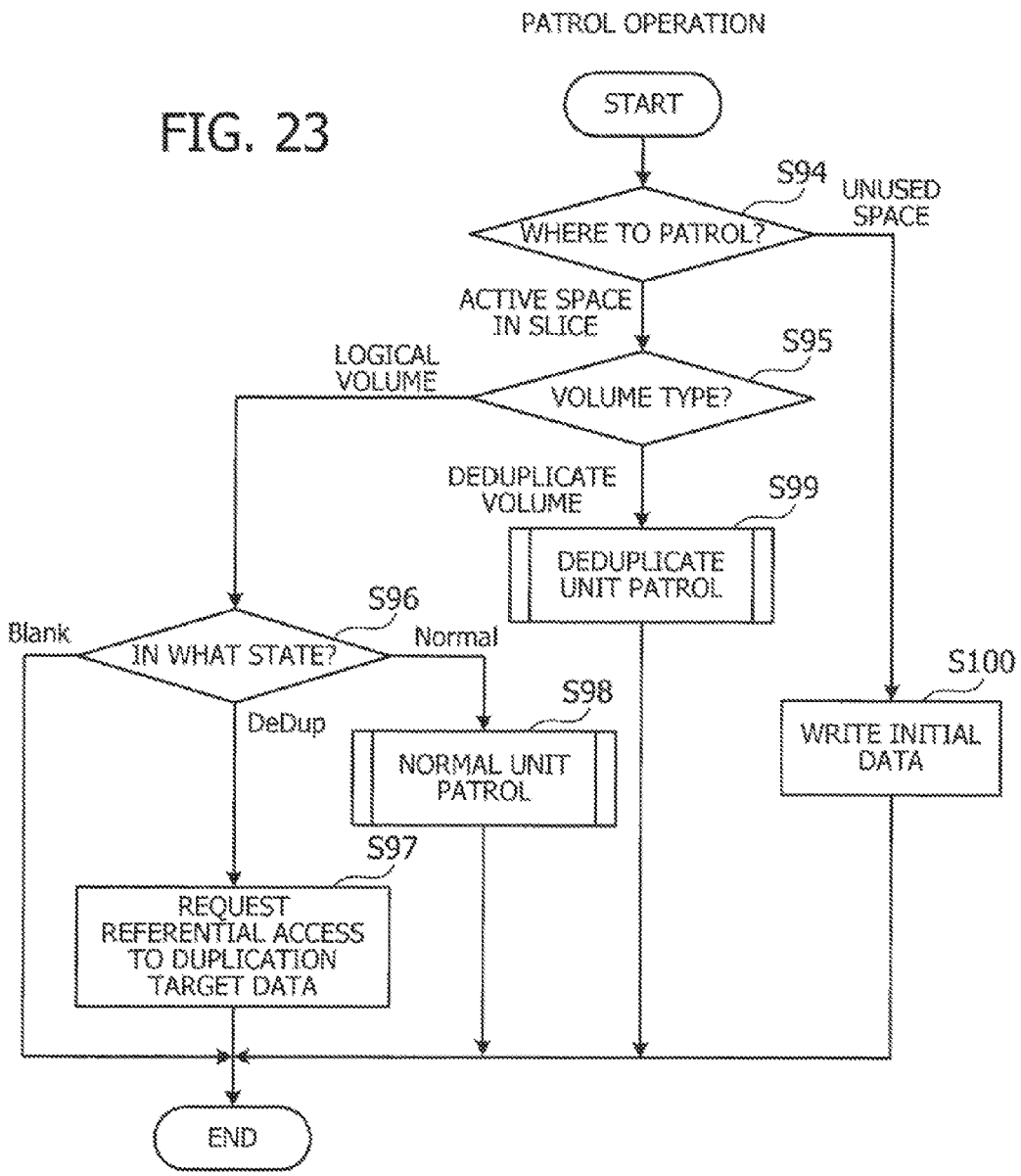
FIG. 23 is a flowchart of a patrol operation.

FIG. 23 is a flowchart of a patrol operation. The following patrol operation is invoked at predetermined intervals, with a coverage over data units in each slice, as well as over unused constituent storage spaces in the data entity region 110b. Each step of FIG. 23 will be described below in the order of step numbers.

(Step S94) The patrol module 150 determines whether the patrol operation is directed to a data unit defined as an active space in the current slice or an unused constituent storage space. In the former case, the process advances to step S95. In the latter case, the process branches to step S100.

(Step S95) The patrol module 150 identifies to which type of volume the slice accommodating the patrolled unit is allocated. Here the type may be either logical volume or deduplicate volume. In the case of logical volume, the process advances to step S96. In the case of deduplicate volume, the process proceeds to step S99.

(Step S96) In the case where the slice accommodating the patrolled unit is allocated to a logical volume, the patrol module 150 tests the state of the data unit by referring to its corresponding data unit record. If the data unit is in Blank state, then the process is terminated. If the data unit is in DeDup state, then the process advances to step S97. If the data unit is in Normal state, then the process proceeds to step S98.

(Step S97) As the data unit is in DeDup state, the patrol module 150 sends a referential access request to the disk node managing deduplication target data of the unit. More specifically, the patrol module 150 requests the deduplicated data access request module 142 to retrieve deduplication target data of the patrolled data unit. In response, the deduplicated data access request module 142 retrieves deduplication target data from a disk node managing the data, based on the deduplicate volume ID and deduplicate offset contained in the data unit record. The retrieved deduplication target data is passed from the deduplicated data access request module 142 to the patrol module 150, and then the patrol operation is terminated.

(Step S98) As the data unit is in Normal state, the patrol module 150 executes a normal unit patrol operation, the details of which will be described later. The process terminates itself after the normal unit patrol operation is finished.

(Step S99) As the patrolled data unit is a deduplicate unit (i.e., a unit of a slice allocated to a deduplicate volume), the patrol module 150 executes a deduplicate unit patrol operation. The process terminates itself after the deduplicate unit patrol operation is finished.

(Step S100) In the case where the patrol operation is an unused constituent storage space, the patrol module 150 writes initial data (e.g., a series of zeros) in the constituent storage space. The patrol operation is thus terminated.

Figure 24:
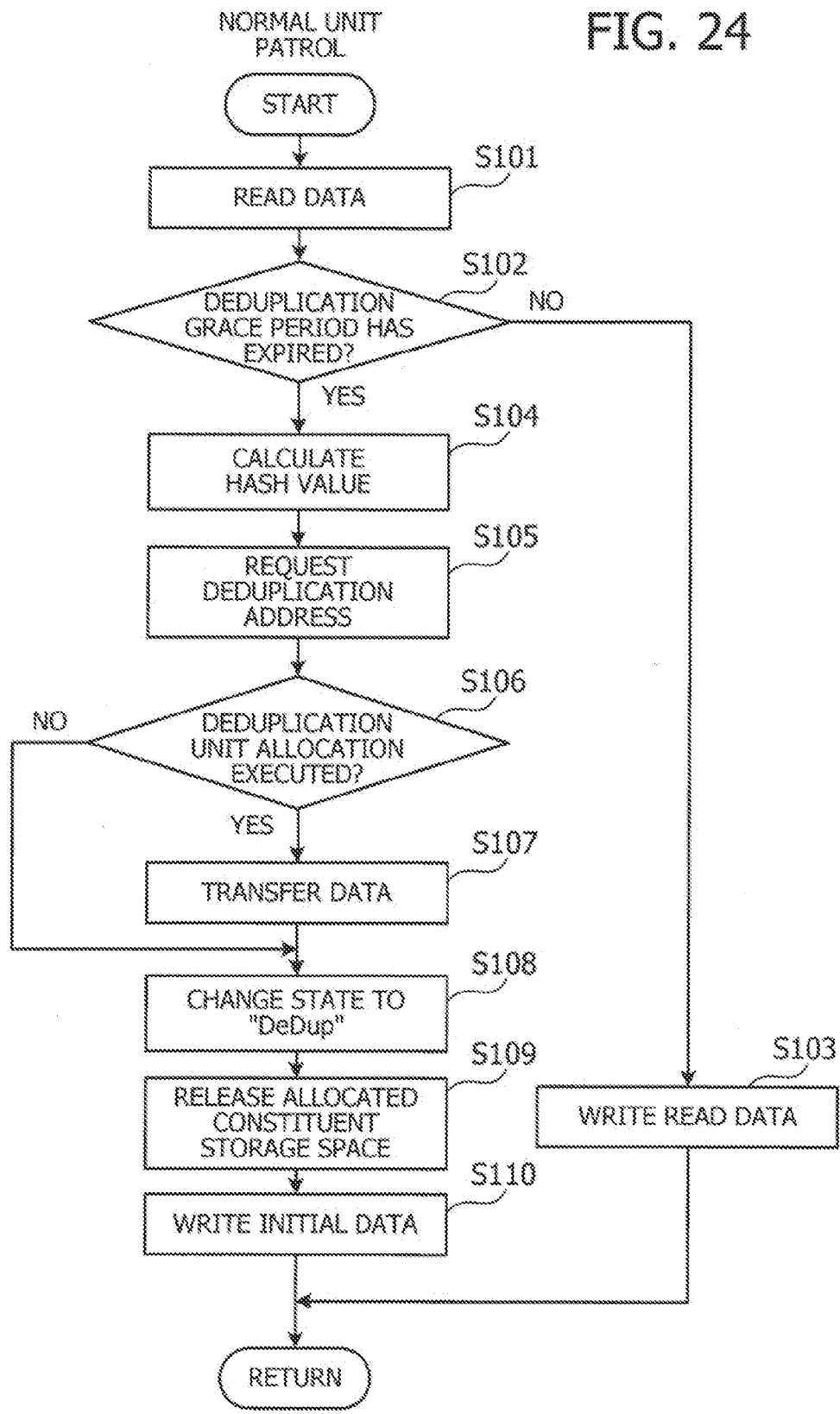
FIG. 24 is a flowchart of a patrol operation on data units in Normal state.

FIG. 24 is a flowchart of a patrol operation on a data unit in Normal state. Each step of FIG. 24 will be described below in the order of step numbers.

(Step S101) The patrol module 150 reads a data entity out of the constituent storage space allocated to the patrolled data unit.

(Step S102) The patrol module 150 calculates how much time has passed since the last write time of the data unit and determines whether it is equal to or longer than the deduplication grace period. If it is, the process advances to step S104. If not, the process advances to step S103.

(Step S103) As the elapsed time is within the deduplication grace period, the patrol module 150 writes the data to the constituent storage space allocated to the data unit. The process is then terminated.

(Step S104) As the deduplication grace period has expired, the patrol module 150 calculates a hash value of the data read out at step S101.

(Step S105) By using the deduplication address query module 133, the patrol module 150 requests and obtains a deduplication address of a deduplicate unit.

(Step S106) The patrol module 150 determines whether the index server 500 has executed a deduplicate unit allocation process in response to the deduplication address request at step S105. The basis for this decision is a response of the index server 500 to the deduplication address request. In the case where a new deduplicate unit allocation process has been executed, the process advances to step S107. In the case where no deduplicate unit allocation process has been executed, the process advances to step S108.

(Step S107) By using the deduplicated data access request module 142, the patrol module 150 transfers the data read out at step S101 to a deduplicate unit that is specified by the deduplication address obtained at step S105.

(Step S108) The patrol module 150 changes the state of the data unit to "DeDup."

(Step S109) The patrol module 150 releases the constituent storage space which has been allocated to the data unit.

(Step S110) The patrol module 150 writes initial data in the released constituent storage space.

The above-described processing steps perform a patrol operation on a data unit in Normal state.

Figure 25:
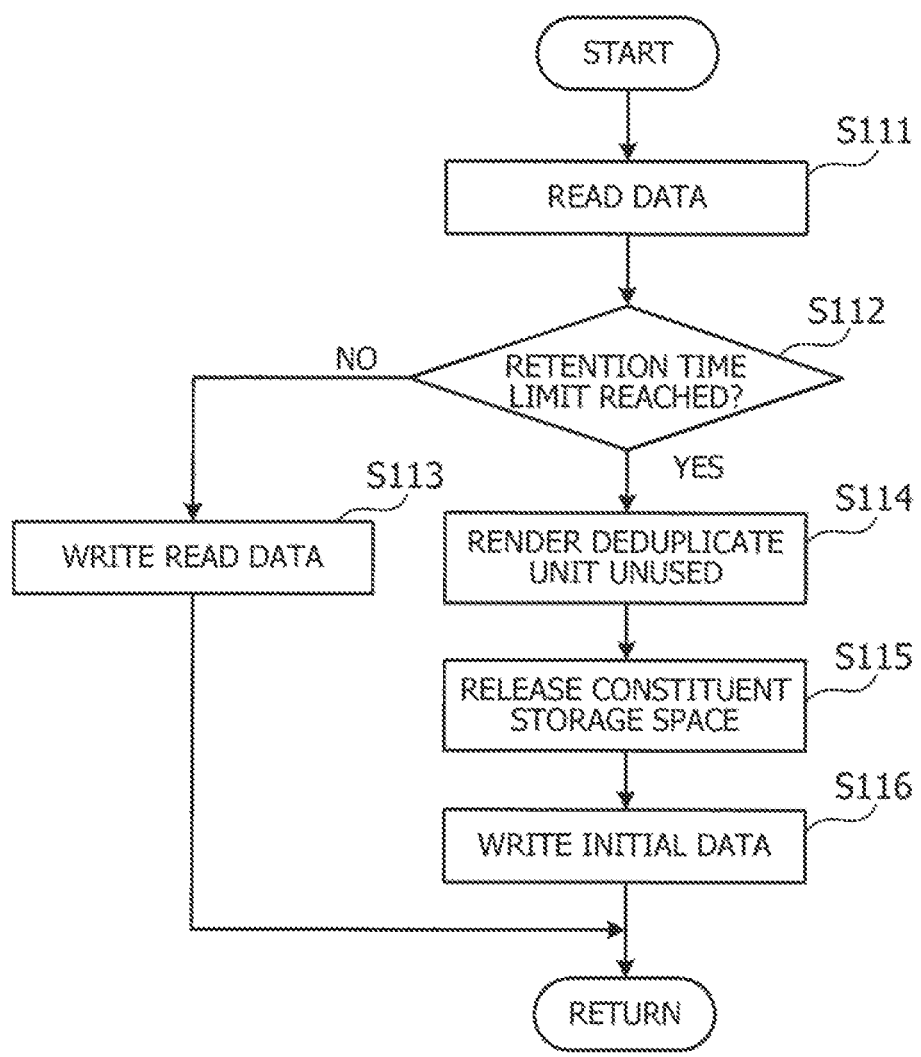
FIG. 25 is a flowchart of a patrol operation on a deduplicate volume.

FIG. 25 is a flowchart of a patrol operation on a deduplicate volume. Each step of FIG. 25 will be described below in the order of step numbers.

(Step S111) The patrol module 150 reads data out of a constituent storage space allocated to a deduplicate unit being patrolled.

(Step S112) The patrol module 150 determines whether the retention time limit of the deduplicate unit has been reached. If so, the process advances to step S114. If not, the process proceeds to step S113.

(Step S113) As it is within the retention limit time, the patrol module 150 writes the data read out at step S111 into the constituent storage space allocated to the deduplicate unit. The process of deduplicate volume patrol is then terminated.

(Step S114) As the retention time limit has been reached, the patrol module 150 renders the deduplicate unit unused. More specifically, the patrol module 150 sets a value of "NULL" to the deduplicate unit record of this expired deduplicate unit.

(Step S115) The patrol module 150 releases (or cancels the existing allocation of) a constituent storage space which has been allocated to the deduplicate unit.

(Step S116) The patrol module 150 writes initial data to the constituent storage space released from the deduplicate unit. The process of deduplicate volume patrol is then terminated.

The patrol module 150 executes patrol operations in the way described above. In the course of a patrol operation, the index server 500 handles deduplication address requests from the patrol module 150. The following section will provide details of this processing function of the index server 500.

Figure 26:
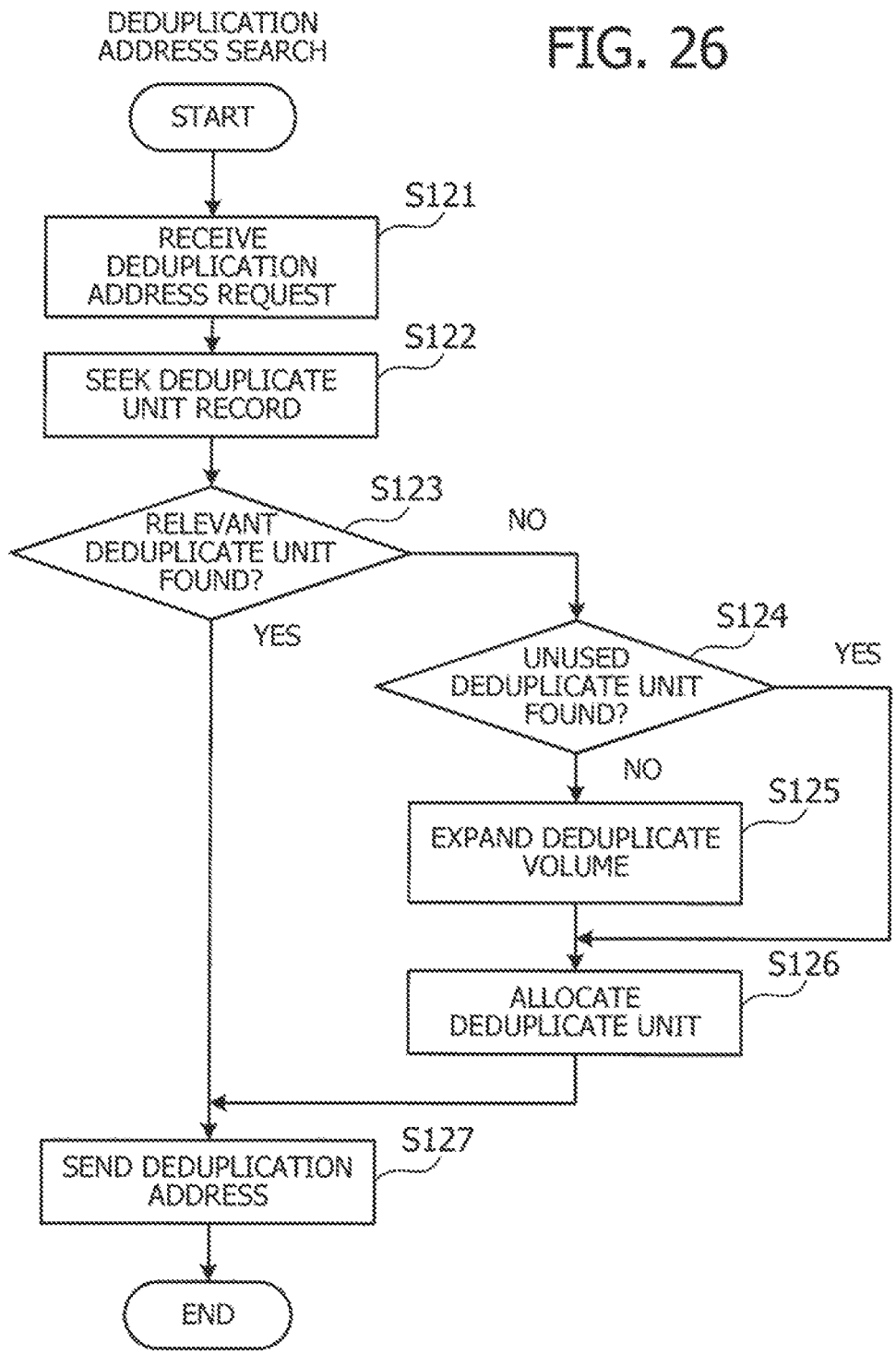
FIG. 26 is a flowchart of a deduplication address search in an index server.

FIG. 26 is a flowchart of a deduplication address search in the index server 500. Each step of FIG. 26 will be described below in the order of step numbers.

(Step S121) The deduplication address search module 514 receives a deduplication address request including a hash value.

(Step S122) The deduplication address search module 514 searches the deduplicate unit record memory 512 to find a deduplicate unit that has the hash value specified in the received deduplication address request.

(Step S123) The deduplication address search module 514 determines whether there exists a relevant deduplicate unit. In the case where a relevant deduplicate unit is found, the process advances to step S127. In the case where no such deduplicate unit is found, the process advances to step S124.

(Step S124) The deduplication address search module 514 determines whether the currently defined deduplicate volume has an unused deduplicate unit. If there is an unused deduplicate unit, the process advances to step S126. If not, the process advances to step S125.

(Step S125) The deduplication address search module 514 expands the deduplicate volume. For example, the deduplication address search module 514 requests the control node 600 to add a new segment to the deduplicate volume. Then in the control node 600, the logical volume management module 630 adds a segment to the deduplicate volume, allocates to the segment a slice that is managed by one of the disk volumes, and produces deduplicate-volume slice metadata therefor. The resulting deduplicate-volume slice metadata is sent to the index server 500, as well as to the disk node managing the allocated slice. The deduplicate-volume slice metadata sent to the index server 500 has been added a disk node ID to indicate which disk node manages that slice. The index server 500 saves the received deduplicate-volume slice metadata in its deduplicate unit record memory 512. Every deduplicate unit record in the newly produced deduplicate-volume slice metadata has an unused state, meaning that a set of unused deduplicate units are made available.

(Step S126) The deduplication address search module 514 allocates an unused deduplicate unit as a storage space of new deduplication target data.

(Step S127) The deduplication address search module 514 sends a deduplication address to the requesting disk node. In the case where a relevant deduplicate unit is found at step S123, this step S127 sends a deduplication address of the found deduplicate unit. In the case where no relevant deduplicate unit is found at step S123, this step S127 sends a deduplication address of the deduplicate unit allocated at step S126.

Through the above-described steps, a deduplication address search is executed in response to a deduplication address request. When unused deduplicate units are exhausted, the existing deduplicate volume is expanded as necessary. That is, the deduplicate volume is initially configured with a minimum required storage capacity, and it is expanded when there is a shortage of available deduplicate units. This resizing of storage volumes enables more efficient use of resources in the entire system.

As a result of patrol operations discussed above, the disk node moves data from a logical volume to a deduplicate volume upon expiration of a deduplication grace period after their last write operations. Left in the logical volume are deduplication addresses that point to the destination deduplicate units. Patrol operations on a deduplicate volume find a deduplicate unit whose retention time limit is reached. The data of this deduplicate unit is removed, and its corresponding constituent storage space in the data entity region is released.

Unused Unit Record Reflection

As a result of patrol operations, the state of deduplicate units under the management of disk nodes 100, 200, 300, and 400 is reset to the unused state (represented by a value of "NULL") when the links from data units are lost. The new state of those deduplicate units is supposed to be reflected in the deduplicate unit record memory 512 of the index server 500.

Figure 27:
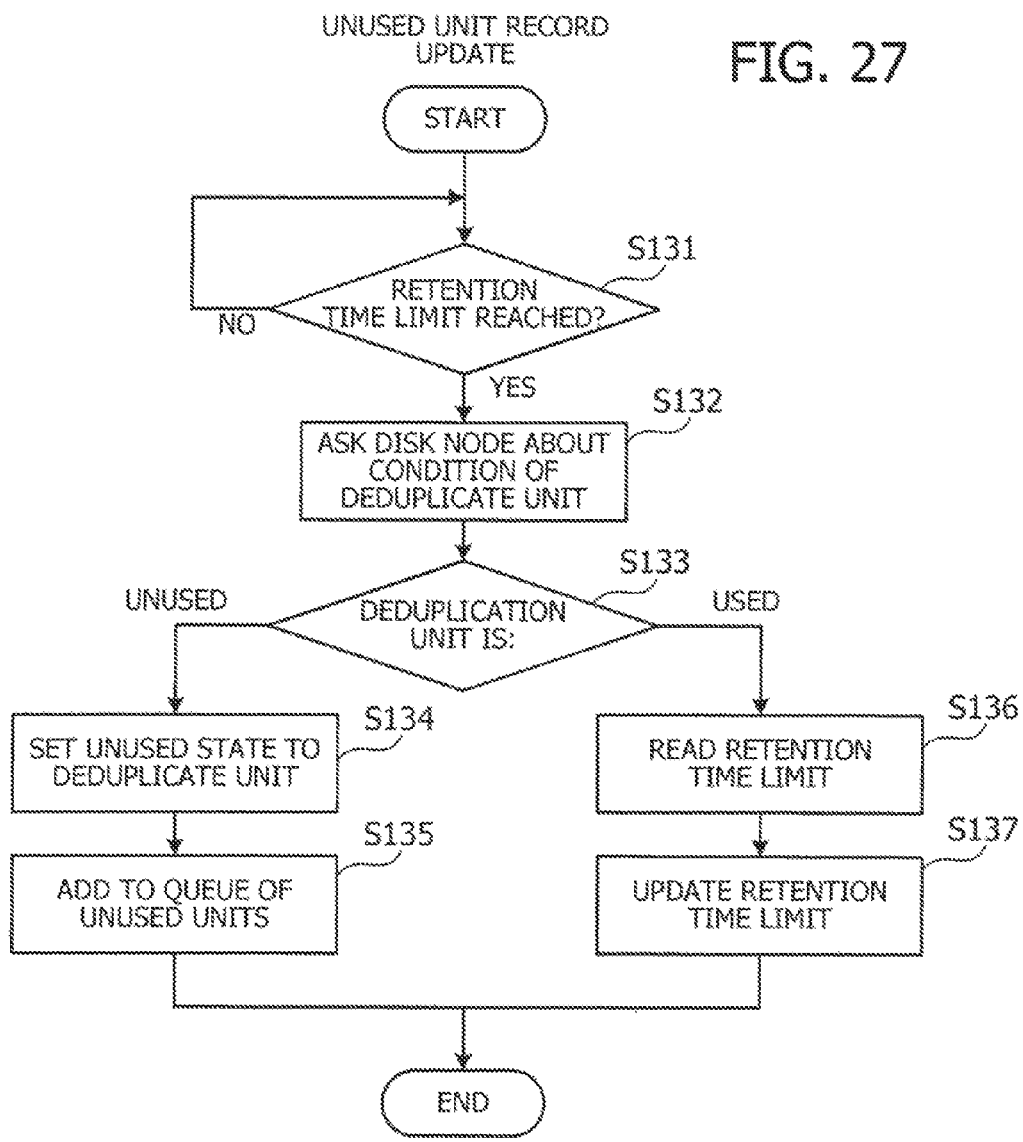
FIG. 27 is a flowchart of an unused unit record reflection process.

FIG. 27 is a flowchart of an unused unit record reflection process. This process is executed for each individual deduplicate unit record stored in the deduplicate unit record memory 512. Each step of FIG. 27 will be described below in the order of step numbers.

(Step S131) With respect to a specific deduplicate unit, the deduplicate unit record collection module 511 in the index server 500 determines whether the retention time limit has been reached. When the retention time limit is found to be reached, the process advances to step S132. Otherwise, the process repeats this step S131.

(Step S132) The deduplicate unit record collection module 511 needs information on the current condition of the deduplicate unit. Since this information is available in a relevant deduplicate unit record, the deduplicate unit record collection module 511 sends a query to the disk node storing the record. Here the deduplicate unit in question is uniquely specified by a deduplicate volume ID and a deduplicate offset (i.e., the unit's offset within the deduplicate volume). The above query is responded by a deduplicate unit record handling module in the disk node, and this response includes the up-to-date deduplicate unit record.

(Step S133) The deduplicate unit record collection module 511 determines the state of the deduplicate unit, based on the response from the disk node. More specifically, the deduplicate unit record collection module 511 determines that the deduplicate unit in question is unused if the received deduplicate unit record has a value of NULL. Otherwise, the deduplicate unit record collection module 511 determines that the deduplicate unit in question is in use. In the former case, the process advances to step S134. In the latter case, the process advances to step S136.

(Step S134) Now that the deduplicate unit in question is found unused in the disk node, the deduplicate unit record collection module 511 gives the same unused state to its corresponding deduplicate unit record in the deduplicate unit record memory 512. More specifically, the deduplicate unit record collection module 511 changes its local deduplicate unit record to NULL.

(Step S135) As a result of step S134, the deduplicate unit is in unused state. The deduplicate unit record collection module 511 thus puts it into a queue of unused units by adding a pointer to the corresponding deduplicate unit record. The process is then terminated.

(Step S136) Having found that the deduplicate unit in question is used in the disk node, the deduplicate unit record collection module 511 reads its retention time limit from the deduplicate unit record collected from the disk node.

(Step S137) The deduplicate unit record collection module 511 updates the retention time limit field of a relevant deduplicate unit record in the deduplicate unit record memory 512. The process is then terminated.

Through the above processing steps, the up-to-date content of deduplicate unit records in disk nodes 100, 200, 300, and 400 is reflected in the index server 500. That is, when the index server finds that the retention time limit of its deduplicate unit records is reached, it fetches the latest deduplicate unit records from a disk node managing the deduplicate units. The index server 500 updates its deduplicate unit record memory 512 with the content of the fetched deduplicate unit records.

Figure 28:
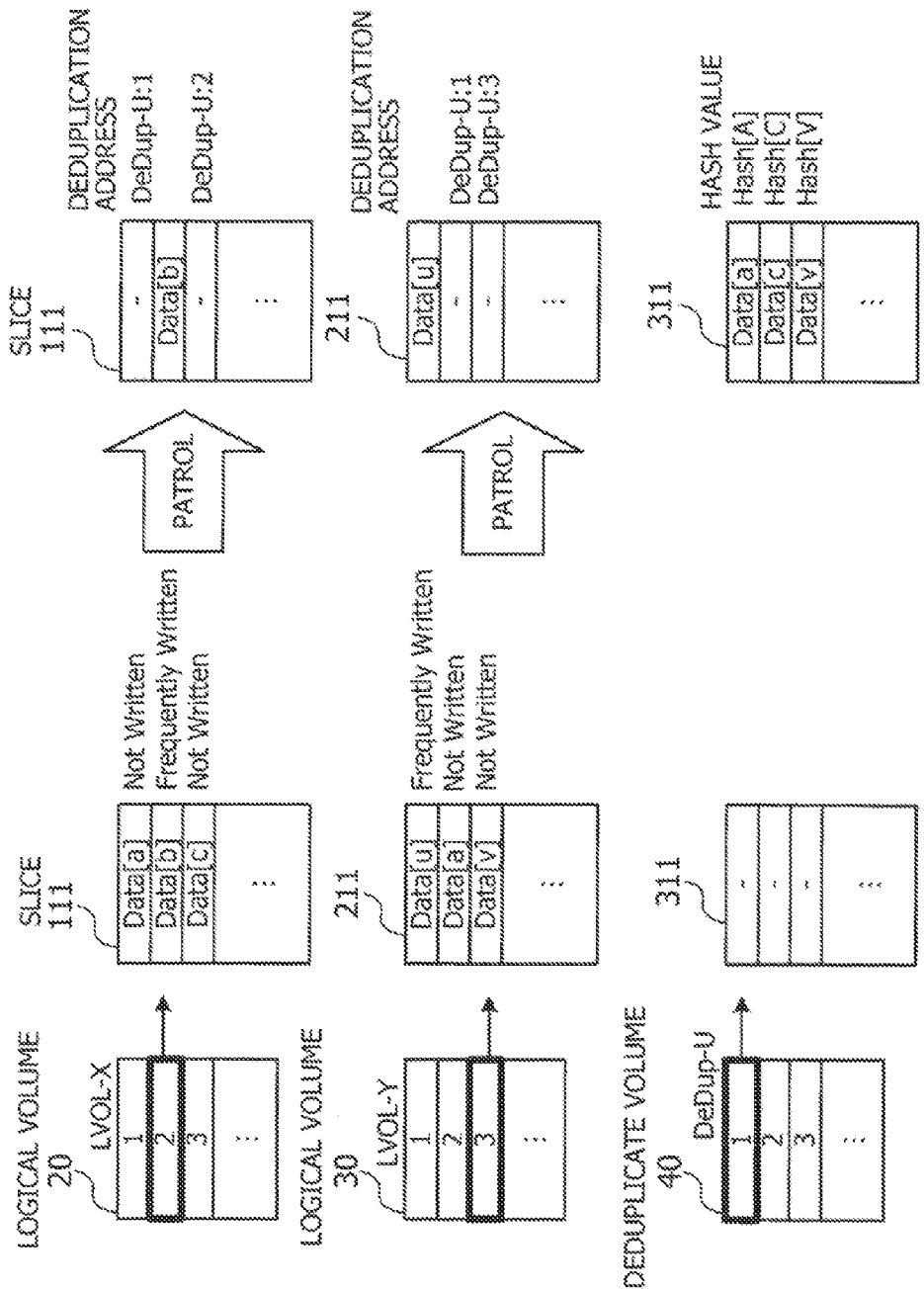
FIG. 28 illustrates how data locations are changed as a result of patrol operations.

FIG. 28 illustrates how the data locations are changed as a result of patrol operations. In the example of FIG. 28, one segment with a segment ID of 2 resides in a logical volume 20 and is allocated a slice 111 managed by a disk node 100. On the other hand, another segment with a segment ID of 3 resides in another logical volume 30 and is allocated a slice 211 managed by a disk node 200. Further, yet another segment with a segment ID of 1 resides in a deduplicate volume 40 and is allocated a slice 311 managed by a disk node 300.

The slice 111 offers topmost three constituent storage spaces for three data units, which are currently used to store Data[a], Data[b], and Data[c], respectively. The slice 211, on the other hand, serves topmost three constituent storage spaces for three data units, which are currently used to store Data[u], Data[a], and Data[v], respectively. As can be seen, the topmost data unit of one slice 111 and the second data unit of another slice 211 have identical data, Data[a].

It is assumed here that the second data unit of slice 111 and the first data unit of slice 211 have been experiencing frequent write operations. Their last write times are so recent that they are still in their deduplication grace period. In contrast, the other data units have not been written for more than the deduplication grace period.

The disk nodes patrol their respective storage spaces in the above situation, thus extracting data units that have not been written for more than the deduplication grace period. Data in these data units is selected as deduplication target data and transferred to the deduplicate volume 40. In the example of FIG. 28, Data[a], Data[c], and Data[v] are moved to the topmost three deduplicate units in the deduplicate volume 40 in that order.

Each source data unit of moved data is given a deduplication address uniquely associated with the destination deduplicate unit. FIG. 28 indicates such a deduplication address in the form of a combination of deduplicate volume ID and deduplicate unit offset delimited by a colon, as in DeDup-U: 1. In the example of FIG. 28, the first segment (segment ID=1) of the deduplicate volume is used to provide those deduplicate units. Accordingly, the offset values of deduplicate units coincide with their respective positions within the segment.

The hash function is supposed to return the same value for identical instances of source data. In the example of FIG. 28, the hash value of Data[a] is seen as Hash[A]. Likewise, the hash values of Data[c] and Data[v] are seen as Hash[C] and Hash[V], respectively.

A hash value is calculated during the course of movement of data from a source data unit to a deduplicate volume. If the hash value matches with that of an existing deduplicate unit, then the deduplication address of that deduplicate unit is assigned to the source data unit. Referring to the example of FIG. 28, Data[a] is duplicated in two logical volumes 20 and 30 before patrol operations are made. They are deduplicated as a result of patrol operations, and a single instance of Data [a] is now seen in the deduplicate volume 40. The two vacated data units are given the same deduplication address that points to the deduplicate unit accommodating Data[a]. The total amount of data stored in the system can be reduced in this way, which contributes to efficient use of resources.

Deduplication target data moved from a logical volume to a deduplicate volume may still be modified by a write access from access nodes. When a data unit is subjected to such a write access, the modified data is stored in a constituent storage space newly allocated to the data unit, and the link from the data unit to the deduplicate unit is canceled.

Figure 29:
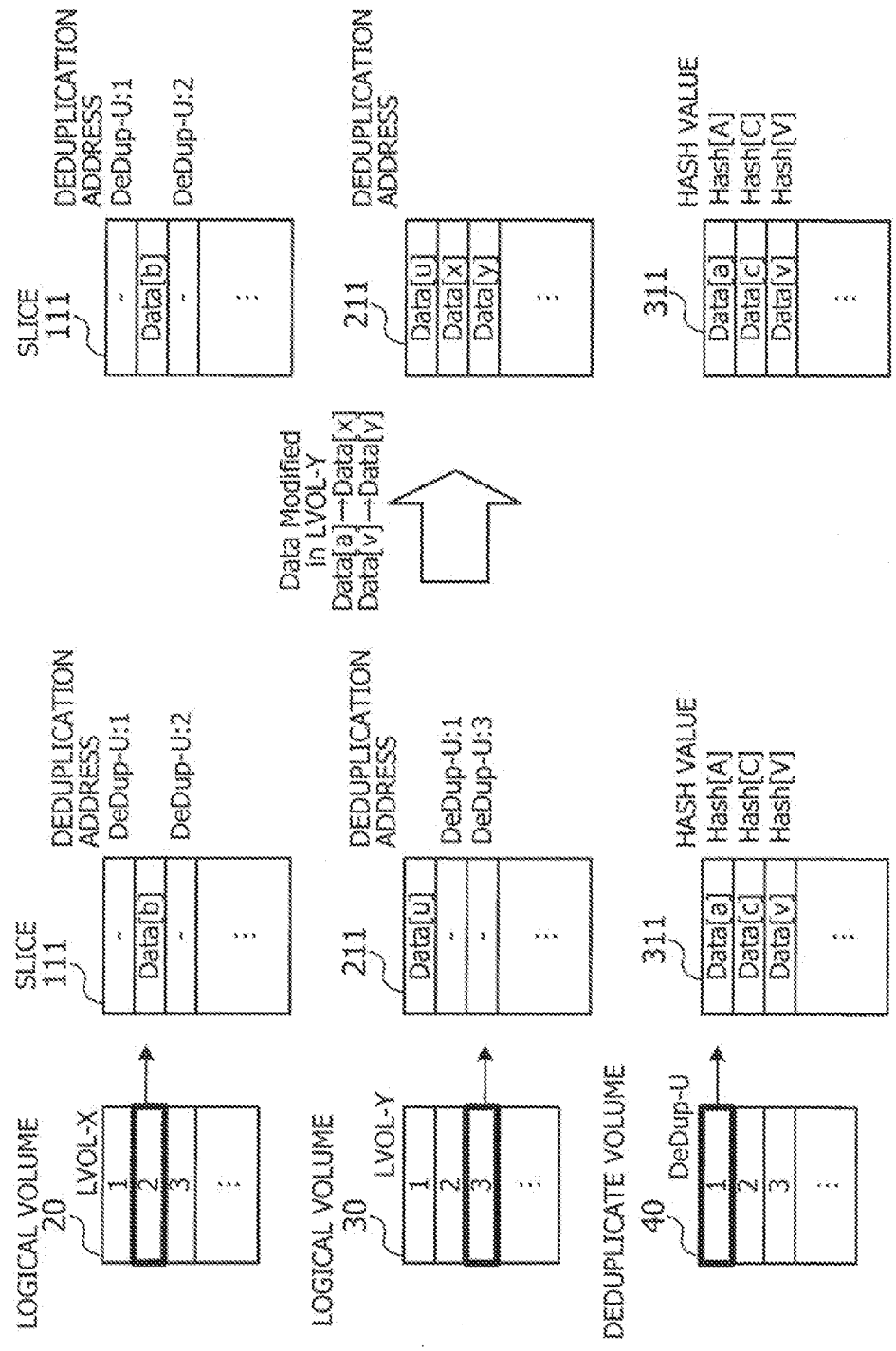
FIG. 29 illustrates how links to a deduplicate unit are cancelled.

FIG. 29 illustrates how links to a deduplicate unit are cancelled. The example of FIG. 29 assumes that write operations are performed on a segment with a segment ID of 3 in a logical volume 30. More specifically, a slice 211 is allocated to this segment, and the write operations change the second and third data units of the slice 211 to Data[x] and Data[y], respectively. In this case, Data[x] and Data[y] are stored in two constituent storage spaces allocated to the changed data units, while the deduplication address is removed from records of those data units. The removal of deduplication addresses means cancellation of the links from the data units to the deduplicate unit. When a deduplicate unit is freed from all associated data units, its stored data is deleted, and the deduplicate unit is reset to the unused state.

Figure 30:
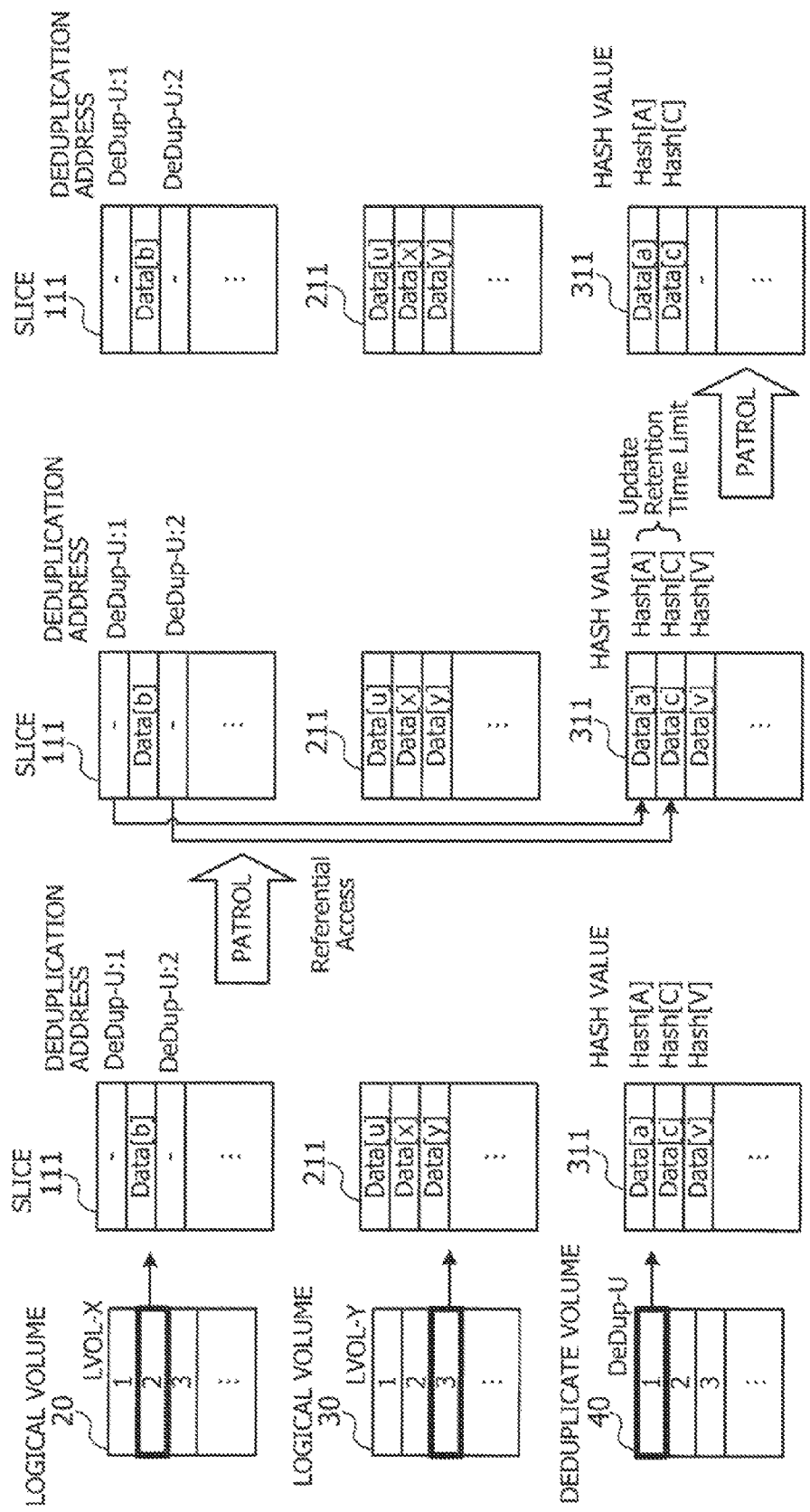
FIG. 30 illustrates how deduplicate units are reset to unused state.

FIG. 30 illustrates how deduplicate units are reset to unused state. Specifically, FIG. 30 illustrates a situation where a patrol operation is performed in one disk node 100 and then in another disk node 300. The first patrol operation in the disk node 100 invokes a referential access operation (data reading) on deduplicate units associated with data units, which causes update of their retention time limit.

The subsequent patrol operation in the disk node 300 reveals that the retention time limit is reached in some deduplicate units having no associated data units. Those obsolete deduplicate units are then changed to the unused state. In the example of FIG. 30, this change is seen with the third deduplicate unit in the slice 311, which is allocated to a segment with a segment ID of 1 in the deduplicate volume 40.

As can be seen from the above description, the present embodiment removes obsolete data from the deduplicate volume 40. This processing contributes to more efficient use of resources.

Variations of Embodiments

The above-described second embodiment implements an index server 500 and a control node 600 as separate devices. As an alternative to this configuration, the functions of the index server 500 and control node 600 may be integrated into a single device. As yet another alternative, the functions of the index server 500 may be incorporated into one of the disk nodes 100, 200, 300, and 400.

The above-described second embodiment is configured to update the retention time limit of a deduplicate unit when referential access is made to the deduplicate unit. The patrol operation on data units in DeDup state thus includes referential access to deduplicate units associated with those data units to update their retention time limits. This operation may be modified to use other functions in place of referential access to update the retention time limits. For example, one disk node managing data units may be configured to send a request for updating retention time limits to another disk node managing deduplicate units each time a patrol operation is performed. The requested disk node then updates the retention time limit of a specified deduplicate unit.

As another variation of the above-described embodiments, the calculation of hash values with a hash function may be replaced with a process of, for example, data encryption. The resulting encrypted data is used in place of hash values.

Computer-Readable Medium

The above-described processing functions may be implemented on a computer system. To achieve this implementation, the instructions describing the functions of disk nodes 100, 200, 300, and 400, index server 500, control node 600, and access nodes 700 and 800 are encoded and provided in the form of computer programs. A computer system executes those programs to provide the processing functions discussed in the preceding sections. The programs may be encoded in a non-transitory computer-readable medium for the purpose of storage and distribution. Such computer-readable media include magnetic storage devices, optical discs, magneto-optical storage media, semiconductor memory devices, and other tangible storage media. Magnetic storage devices include hard disk drives (HDD), flexible disks (FD), and magnetic tapes, for example. Optical disc media include DVD, DVD-RAM, CD-ROM, CD-RW and others. Magneto-optical storage media include magneto-optical discs (MO), for example.

Portable storage media, such as DVD and CD-ROM, are used for distribution of program products. Network-based distribution of software programs may also be possible, in which case several master program files are made available on a server computer for downloading to other computers via a network.

A computer stores necessary software components in its local storage unit, which have previously been installed from a portable storage media or downloaded from a server computer. The computer executes programs read out of the local storage unit, thereby performing the programmed functions. Where appropriate, the computer may execute program codes read out of a portable storage medium, without installing them in its local storage device. Another alternative method is that the computer dynamically downloads programs from a server computer when they are demanded and executes them upon delivery.

The processing functions discussed in the preceding sections may also be implemented wholly or partly by using a digital signal processor (DSP), application-specific integrated circuit (ASIC), programmable logic device (PLD), or other electronic circuit.

CONCLUSION

The above sections have exemplified several embodiments and their variations. The described components may be replaced with other components having equivalent functions or may include other components or processing operations. Where appropriate, two or more components and features provided in the embodiments may be combined in a different way.

The above-described embodiments offer a multi-node storage system which reduces the amount of redundant data in disk nodes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A computer-readable, non-transitory medium storing a data management program for use in a multi-node storage system formed from a plurality of disk nodes each managing a storage device to store data in a distributed manner, the data management program, when executed by a computer serving as one of the disk nodes, causing the computer to perform a procedure comprising:

allocating one of constituent storage spaces in a storage device coupled to the computer, to one of data units constituting a logical volume that provides a virtual storage space, in response to a write request specifying the one of data units as a destination of write data, and writing the write data to the allocated constituent storage space;

recording, upon the writing of the write data, a current time in a data unit record memory as a record of last write time of the data unit to which the write data has been written;

detecting, by consulting the data unit information memory, a data unit whose deduplication grace period after the last write time has expired;

obtaining, from an index server, one of deduplication addresses that is associated with a first unique value obtained by applying a predetermined computation to data stored in the constituent storage space allocated to the detected data unit, wherein the index server manages the deduplication addresses each including an identifier of a disk node managing a deduplicate unit and a second unique value obtained by applying the predetermined computation to deduplication target data stored in the deduplicate unit, and wherein the deduplicate unit is provided in a plurality to constitute a deduplicate volume that provides another virtual storage space; and storing the obtained deduplication address in the data unit record memory, together with the detected data unit, and canceling the allocation of the constituent storage spaces to the detected data unit.

2. The computer-readable, non-transitory medium according to claim 1, wherein the procedure further comprises:
allocating, in response to a deduplicate unit allocation request received from the index server which specifies an identifier of one of the deduplicate units, one of the constituent storage spaces to the specified deduplicate unit, obtaining the deduplication target data in the specified deduplicate unit by making access to the disk node having a link to the specified deduplicate unit, and storing the obtained deduplication target data in the allocated constituent storage space; and
sending, in response to a data read request specifying an identifier of the deduplicate unit, the deduplication target data read out of the constituent storage space allocated to the specified deduplicate unit.

3. The computer-readable, non-transitory medium according to claim 2, wherein the procedure further comprises:
deallocating the constituent storage space from the deduplicate unit when there is no disk node that has a link to the deduplicate unit to read the deduplication target data therefrom.

4. The computer-readable, non-transitory medium according to claim 3, wherein the procedure further comprises:
storing a retention time limit of a deduplicate unit in a deduplicate unit record memory, the retention time limit being calculated by adding a predetermined retention period to a last read time at which a latest read operation has been performed on the constituent storage space allocated to the deduplicate unit; and
searching the deduplicate unit record memory to detect a deduplicate unit whose retention time limit has been reached, and deallocating the constituent storage space from the detected deduplicate unit.

5. The computer-readable, non-transitory medium according to claim 2, wherein the procedure further comprises:
deallocating the constituent storage space allocated to the data unit after transferring data from the constituent storage space to the disk node specified by the deduplication address, when the deduplication address obtained from the index server is of a newly allocated deduplicate unit.

6. The computer-readable, non-transitory medium according to claim 1, wherein the procedure further comprises:
patrolling the data unit record memory at regular intervals to find a data unit associated with a deduplication address, and obtaining data from the disk node specified by the deduplication address by specifying an identifier of the deduplicate unit which is indicated in the deduplication address.

7. The computer-readable, non-transitory medium according to claim 1, wherein the second unique value is a hash value calculated by applying a predetermined hash function to the deduplication target data.

8. The computer-readable, non-transitory medium according to claim 1, wherein the identifier of the deduplicate unit is an offset indicating a location of the deduplicate unit in the deduplicate volume.

9. The computer-readable, non-transitory medium according to claim 1, wherein the procedure further comprises:
searching, in response to a read request specifying a data unit that has not been allocated a constituent storage space, the data unit record memory to find a deduplication address of the specified data unit, and obtaining deduplication target data from the disk node indicated in the found deduplication address by specifying an identifier of the deduplicate unit indicated in the found deduplication address.

10. The computer-readable, non-transitory medium according to claim 1, wherein the procedure further comprises:
reading, in response to a read request specifying a data unit, data out of the constituent storage space allocated to the specified data unit.

11. A computer-readable, non-transitory medium storing a data management program for managing storage spaces in a multi-node storage system formed from a plurality of disk nodes each managing a storage device to store data in a distributed manner, the data management program, when executed by a computer, causing the computer to perform a procedure comprising:
storing, in a deduplicate unit record memory, deduplicate unit records each including information indicating use of a deduplicate unit in a disk node, a first unique value obtained by applying a predetermined computation to deduplication target data stored in a constituent storage space allocated to the deduplicate unit being used, and an identifier of the deduplicate unit, wherein the deduplicate unit records are stored together with an identifier of a disk node that manages the deduplicate units, and wherein the deduplicate units constitute a deduplicate volume that provides another virtual storage space;
receiving from one of the disk nodes a deduplication address request specifying a second unique value obtained by applying the predetermined computation to data in a constituent storage space allocated to a deduplication-eligible data unit wherein the deduplication-eligible data unit is data unit whose deduplication grace period after a last write time has expired, and searching the deduplicate unit record memory to find a deduplicate unit record that contains the second unique value specified in the deduplication address request;
returning a first deduplication address to the disk node that has issued the deduplication address request when a relevant deduplicate unit record is found as a result of the searching, wherein the first deduplication address includes an identifier of a deduplicate unit which is contained in the found deduplicate unit record, and an identifier of a disk node that manages the deduplicate unit corresponding to the found deduplicate unit record; and
consulting the deduplicate unit record memory to select one of the deduplicate units that is not used when no relevant record is found as a result of the searching, sending an allocation request to a disk node that manages the selected deduplicate unit for allocation of a constituent storage space to the selected deduplicate unit, storing an updated deduplicate unit record of the selected deduplicate unit in the deduplicate unit record memory to record the constituent storage space allocated to the selected deduplicate unit, and returning a second deduplication address to the disk node that has issued the deduplication address request, wherein the second deduplication address includes an identifier of the selected deduplicate unit and an identifier of the disk node managing the selected deduplicate unit.

12. The computer-readable, non-transitory medium according to claim 11, wherein the procedure further comprises:
collecting the deduplicate unit records from each of the plurality of disk nodes, and storing the collected deduplicate unit records in the deduplicate unit record memory, together with identifiers of the disk nodes that have provided the deduplicate unit records.

13. The computer-readable, non-transitory medium according to claim 11, wherein:
the deduplicate unit record of a deduplicate unit includes a retention time limit calculated by adding a predetermined retention period to a last read time at which a latest read operation has been performed on the constituent storage space allocated to the deduplicate unit; and
the procedure further comprises:
searching the deduplicate unit record memory to detect a deduplicate unit record whose retention time limit has been reached, and
obtaining a latest version of the detected deduplicate unit record from the disk node that has originally provided the detected deduplicate unit record.

14. An apparatus for managing data in a multi-node storage system formed from a plurality of disk nodes each managing a storage device to store data in a distributed manner, the apparatus comprising:
write access means that allocates one of constituent storage spaces in a storage device coupled to the computer, to one of data units constituting a logical volume that provides a virtual storage space, in response to a write request specifying the one of data units as a destination of write data, and writes the write data to the allocated constituent storage space;
last write time update means that records a current time in the memory as a record of last write time of the data unit to which the write data has been written;
deduplication-pending data unit detection means that detects, by consulting the memory, a data unit whose deduplication grace period after the last write time has expired;
deduplication address fetch means that obtains, from an index server, one of deduplication addresses that is associated with a first unique value obtained by applying a predetermined computation to data stored in the constituent storage space allocated to the detected data unit, wherein the index server manages the deduplication addresses each including an identifier of a disk node managing a deduplicate unit and a second unique value obtained by applying the predetermined computation to deduplication target data stored in the deduplicate unit, and wherein the deduplicate unit is provided in a plurality to constitute a deduplicate volume that provides another virtual storage space;
constituent storage space deallocation means that stores the obtained deduplication address in the data unit record memory, together with the detected data unit, while canceling the allocation of the constituent storage spaces to the detected data unit.

15. An apparatus for managing data in a multi-node storage system formed from a plurality of disk nodes each managing a storage device to store data in a distributed manner, the apparatus comprising:
a processor configured to execute a procedure, the procedure comprising:
allocating one of constituent storage spaces in a storage device coupled to the computer, to one of data units constituting a logical volume that provides a virtual storage space, in response to a write request specifying the one of data units as a destination of write data, and writing the write data to the allocated constituent storage space;
recording, upon the writing of the write data, a current time in a data unit record memory as a record of last write time of the data unit to which the write data has been written;
detecting, by consulting the data unit information memory, a data unit whose deduplication grace period after the last write time has expired;
obtaining, from an index server, one of deduplication addresses that is associated with a first unique value obtained by applying a predetermined computation to data stored in the constituent storage space allocated to the detected data unit, wherein the index server manages the deduplication addresses each including an identifier of a disk node managing a deduplicate unit and a second unique value obtained by applying the predetermined computation to deduplication target data stored in the deduplicate unit, and wherein the deduplicate unit is provided in a plurality to constitute a deduplicate volume that provides another virtual storage space.

16. A method executed by a computer in one of a plurality of disk nodes constituting a multi-node storage system, each disk node managing a storage device to store data in a distributed manner, the method comprising:
allocating one of constituent storage spaces in a storage device coupled to the computer, to one of data units constituting a logical volume that provides a virtual storage space, in response to a write request specifying the one of data units as a destination of write data, and writing the write data to the allocated constituent storage space;
recording, upon the writing of the write data, a current time in a data unit record memory as a record of last write time of the data unit to which the write data has been written;
detecting, by consulting the data unit information memory, a data unit whose deduplication grace period after the last write time has expired;
obtaining, from an index server, one of deduplication addresses that is associated with a first unique value obtained by applying a predetermined computation to data stored in the constituent storage space allocated to the detected data unit, wherein the index server manages the deduplication addresses each including an identifier of a disk node managing a deduplicate unit and a second unique value obtained by applying the predetermined computation to deduplication target data stored in the deduplicate unit, and wherein the deduplicate unit is provided in a plurality to constitute a deduplicate volume that provides another virtual storage space;
storing the obtained deduplication address in the data unit record memory, together with the detected data unit, while canceling the allocation of the constituent storage spaces to the detected data unit.

* * * * *